US010827302B2

(12) United States Patent
Keal

(10) Patent No.: US 10,827,302 B2
(45) Date of Patent: *Nov. 3, 2020

(54) MOBILE TAG SENSING AND LOCATION DETERMINATION

(71) Applicant: enLighted, Inc., Sunnyvale, CA (US)

(72) Inventor: William Kerry Keal, San Jose, CA (US)

(73) Assignee: Enlighted, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,305

(22) Filed: Apr. 12, 2019

(65) Prior Publication Data
US 2019/0239025 A1    Aug. 1, 2019

Related U.S. Application Data

(63) Continuation-in-part of application No. 15/953,466, filed on Apr. 15, 2018.

(60) Provisional application No. 62/568,032, filed on Oct. 4, 2017.

(51) Int. Cl.
H04W 4/021    (2018.01)
H04W 4/02    (2018.01)
H04W 4/33    (2018.01)

(52) U.S. Cl.
CPC .......... *H04W 4/021* (2013.01); *H04W 4/023* (2013.01); *H04W 4/025* (2013.01); *H04W 4/33* (2018.02)

(58) Field of Classification Search
CPC ....... H04W 4/021; H04W 4/33; H04W 4/023; H04W 4/025
See application file for complete search history.

(56) References Cited

U.S. PATENT DOCUMENTS

| 8,494,554 | B2* | 7/2013 | Marti | H04W 4/029 455/456.1 |
| 9,185,542 | B1* | 11/2015 | Boyle | H04W 4/029 |
| 9,936,342 | B2* | 4/2018 | Huang | H04W 4/40 |
| 2011/0244887 | A1 | 10/2011 | Dupray et al. | |
| 2014/0274116 | A1* | 9/2014 | Xu | G01S 11/06 455/456.1 |
| 2016/0088438 | A1* | 3/2016 | O'Keeffe | H04W 4/21 455/456.2 |

(Continued)

OTHER PUBLICATIONS

PCT Search Report dated Jan. 11, 2019, for PC%T Application No. PCT/US2018/053048, 15 pages.

*Primary Examiner* — Julio R Perez

(57) ABSTRACT

System and method for determining a location of a tag are disclosed. The system comprises a mobile tag, sensors, and a controller. The mobile tag determines a first location within a structure that includes multiple second locations. The sensors are positioned at different locations of the structure and sense a structure condition. The controller determines possible paths of the mobile tag within the structure. Next, the controller generates a first set of weighted likelihoods of the mobile tag being located at each second location based on the possible paths and distances between the first location and the multiple second locations. The controller also generates a second set of weighted likelihoods of the mobile tag being located at each second location based on the structure condition. The controller then determines a location of the mobile tag within the structure based on the first and second sets of weighted likelihoods.

16 Claims, 24 Drawing Sheets

(56) References Cited

U.S. PATENT DOCUMENTS

| | | |
|---|---|---|
| 2017/0017214 A1 | 1/2017 | O'Keeffe |
| 2017/0116483 A1 | 4/2017 | Richardson et al. |
| 2017/0245116 A1* | 8/2017 | Chu .................... H04W 4/043 |
| 2019/0104383 A1 | 4/2019 | Keal et al. |

* cited by examiner

MOBILE TAG SENSING AND LOCATION DETERMINATION

RELATED APPLICATIONS

This patent application claims priority to U.S. patent application Ser. No. 15/953,466, filed Apr. 15, 2018, which claims the benefit of U.S. Provisional Patent Application Ser. No. 62/568,032, filed Oct. 4, 2017, which are herein incorporated by reference.

FIELD OF THE INVENTION

The described embodiments relate generally to building controls. More particularly, the described embodiments relate to location estimation of a mobile tag within a structure.

BACKGROUND

Intelligent building control provides for control of structure that is user intelligent. That is, based on behavior or predicted behavior of users within the structure, the intelligent building control provides the users with intelligent environmental controls, safety controls, logistical, and/or information control.

It is desirable to have a method, system and apparatus for predicting locations of an occupant or an asset, or a tag associated with the occupant or asset, within a structure.

SUMMARY

There is provided a mobile tag sensing and location estimation technique for indoor structures. Generally, this technique determines the location of a mobile tag by generating multiple different likelihood maps and combining them to maximize the likelihood of identifying the true location of the mobile tag. Each likelihood map utilizes independent approaches for determining the location of the mobile tag, and the likelihood maps are combined to determine the best location. A distance likelihood map represents possible paths of the mobile tag and probabilities of the mobile tag taking the possible paths. Examples of other likelihood maps utilized by the technique includes, but are not limited to, a radio frequency ("RF") likelihood map, a motion likelihood map, a structure likelihood map, other distance maps based on acoustic sensors, and the like. For one embodiment, a distance likelihood map may be combined with an RF likelihood map based on received signal strength indicator ("RSSI") sensors receiving beacons from the mobile tag. For another embodiment, a distance likelihood map may be combined with a motion likelihood map based on passive infrared sensors detecting motion within a structure. Further embodiments include other combinations of the distance likelihood map being combined with one or more other likelihood maps in order to determine the true location of the mobile tag accurately. Still further embodiments may also feed one or more likelihood maps, or a combination of likelihood maps, into an optimal estimator, such as a Kalman filter, for another likelihood.

One aspect is a location determining system comprising a mobile tag, sensors, and a controller. The mobile tag is configured to determine a first location within a structure, in which the structure includes multiple second locations. The sensors are positioned at different locations of the structure, in which the sensors are configured to sense a structure condition. The controller operates to determine possible paths of the mobile tag within the structure. The controller also generates a first set of weighted likelihoods of the mobile tag being located at each second location of the multiple second locations based on the possible paths and distances between the first location and the multiple second locations. The controller further generates a second set of weighted likelihoods of the mobile tag being located at each second location of the multiple second locations based on the structure condition. The controller still further determines a location of the mobile tag within the structure based on the first set of weighted likelihoods and the second set of weighted likelihoods. Accordingly, a location of the mobile tag within the structure is determined based on the combined set of likelihoods.

Another aspect is a method of a location determining system. A first location of a mobile tag within a structure is determined, and multiple second locations within the structure are identified. Possible paths of the mobile tag within the structure are also determined. In addition, a structure condition is sensed by multiple sensors positioned at different locations of the structure. Next, a first set of weighted likelihoods of the mobile tag being located at each second location of the plurality of second locations is generated based on the possible paths and distances between the first location and the multiple second locations. Also, a second set of weighted likelihoods of the mobile tag being located at each second location of the multiple second locations is generated based on the structure condition. A location of the mobile tag within the structure is then determined based on the first set of weighted likelihoods and the second set of weighted likelihoods.

Other aspects and advantages of the described embodiments will become apparent from the following detailed description, taken in conjunction with the accompanying drawings, illustrating by way of example the principles of the described embodiments.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
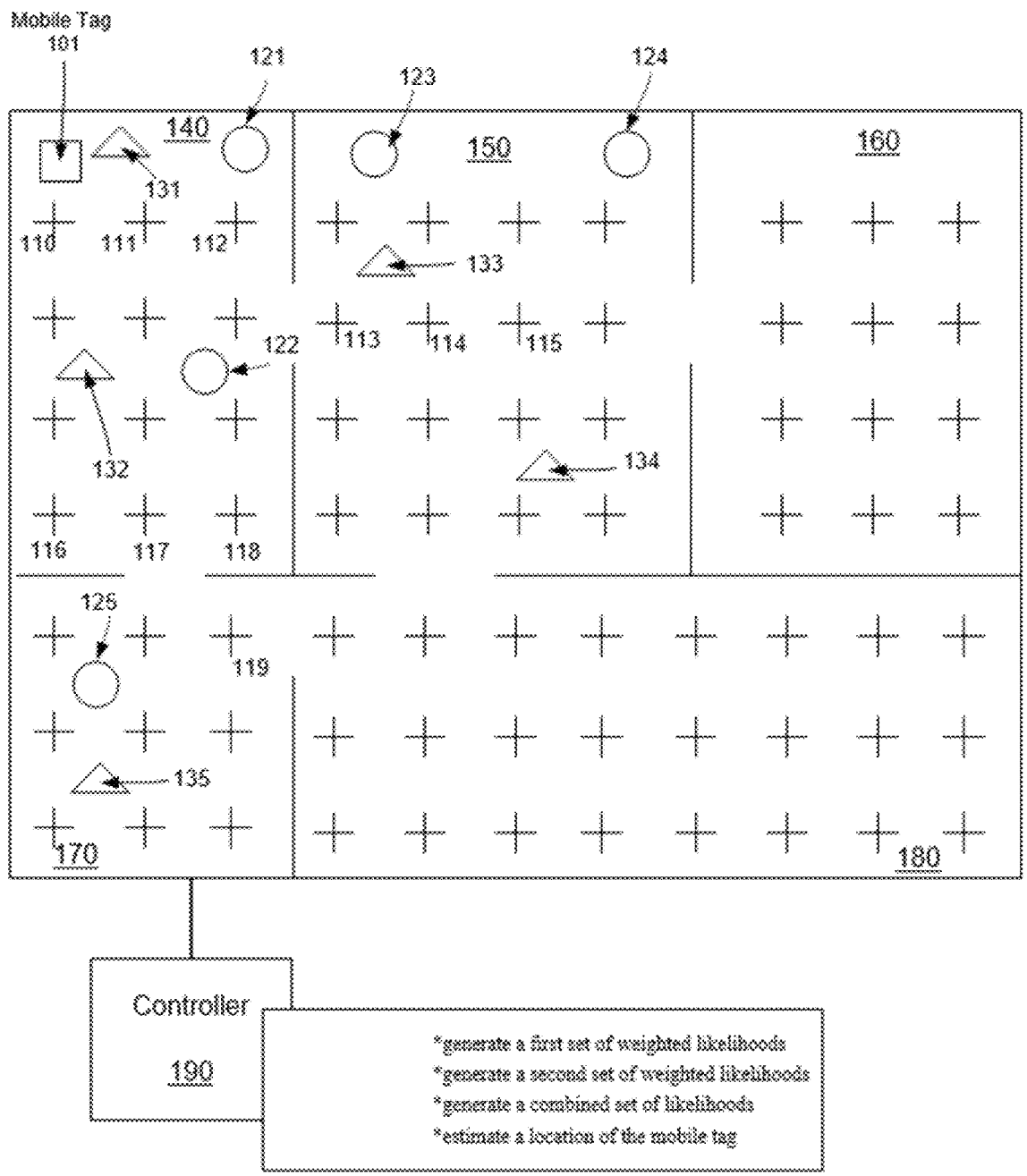
FIG. 1 shows a structure that includes a first set of sensors, a second set of sensors, and a controller that estimates a location of a mobile tag based on sensed signals of the first and second sets of sensors, according to an embodiment.

Various technologies that pertain to systems and methods that determine a location of a mobile tag will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The described embodiments are embodied in methods, apparatuses, and systems for generating weighted likelihood maps for estimating a location of a mobile tag. A first weighted likelihood map is generated based on sensed signals of a first type of sensor. A second weighted likelihood map is generated based on sensed signals of a second type of sensor. A combined set of likelihoods is generated based on the first set of weighted likelihoods and the second set of weighted likelihoods. A location of the mobile tag within the structure is estimated based on the combined set of likelihoods. Additional weighted likelihood maps can be generated to improve the estimation of the location of the mobile tag. For an embodiment, grid points within a structure are identified, and weighted likelihoods of the tag being located at different grid points are estimated. For at least some embodiments, the weighted likelihoods are supplemented with information associated with the tag. At least some embodiments include supplementing building control and/or building intelligence with the estimated location of the mobile tag.

Overview

FIG. 1 shows a structure that includes a first set of sensors 121, 122, 123, 124, 125, a second set of sensors 131, 132, 133, 134, 135, and a controller 190 that estimates a location of a mobile tag 101 based on sensed signals of the first set of sensors 121, 122, 123, 124, 125, and the second set of sensors 131, 132, 133, 134, 135, according to an embodiment. For an embodiment, the first set of sensors 121, 122, 123, 124, 125 sense a first condition of the structure. For an embodiment, the second set of sensors 131, 132, 133, 134, 135 sense a second condition of the structure For an embodiment, the structure is represented by grid points. The grid points provide an overlay that section up the structure, wherein each grid point represents a different location within the structure. For an embodiment, the grid points are evenly-spaced throughout the structure. Exemplary grid points are shown in FIG. 1 as grid points 110, 111, 112, 113, 114, 115, 116, 117, 118, 119. Note that in FIG. 1 many of the grid points do not have reference designators. As shown in FIG. 1, the structure includes several rooms 140, 150, 160, 170, 180 which all include grid points.

For at least some embodiments, a controller 190 is connected to each of the first set of sensors 121, 122, 123, 124, 125, and the second set of sensors 131, 132, 133, 134, 135. The connection between the controller 190 and each sensor can include wired or wireless connections. For an embodiment, each sensor includes a wireless router, and the connection between the controller and each of the sensors can include one or more wireless hops through one or more other sensors.

For at least some embodiments, the controller 190 operates to generate a first set of weighted likelihoods based on the first sensed condition of the structure, wherein the first set of weighted likelihoods includes a weighted likelihood of the mobile tag 101 being at each one of a plurality of grid points within the structure. That is, based on the sensing by the first set of sensors, the controller generates a weighted likelihood that the mobile tag 101 is at each of the grid points. For an embodiment, the first set of sensor includes motion sensors that each sense motion within the structure. Based on the sensed motion, of each of the first set of sensors, the controller generates a map of the grid points that includes a weighted likelihood that the mobile tag 101 is located at each of the grid points.

Further, for at least some embodiments, the controller 190 operates to generate a second set of weighted likelihoods based on the second sensed condition of the structure, wherein the second set of weighted likelihoods includes a weighted likelihood of the mobile tag 101 being at each one of the multiple grid points within the structure. That is, based on the sensing by the second set of sensors, the controller generates a weighted likelihood that the mobile tag is at each of the grid points. For an embodiment, the second set of sensor includes RF (radio frequency) sensors that each sense wireless signals within the structure. Based on the RF signals of each of the first set of sensors, the controller generates a map of the grid points that includes a weighted likelihood that the mobile tag 101 is located at each of the grid points.

For at least some embodiments, at least one of the first set of sensors, the second set of sensors, or a third set of sensors includes acoustic sensors. For an embodiment, sound vibrations generated by the mobile tag are sensed by the acoustic sensors. A time of flight can be estimated by knowing when the sound vibrations are generated and by knowing when the sound vibrations are sensed by the acoustic sensors. Based on a time of flight, the distance between the mobile tag and the acoustic sensors can be estimated. A set of likelihoods of the mobile tag 101 being at each one of the multiple grid points within the structure can be generated by the distance estimates determined through the use of the acoustic sensors.

For at least some embodiments, after generating the first set of weighted likelihoods and the second set of weighted likelihoods, the controller 190 operates to generate a combined set of likelihoods based on the first set of weighted likelihoods and the second set of weighted likelihoods. It is to be understood that the combined set of likelihoods can include any number of possible sets of weighted likelihoods.

For at least some embodiments, the controller operates to estimate a location of the mobile tag 101 within the structure based on the combined set of likelihoods. That is, the combined set of likelihoods includes a weighted likelihood that the mobile tag is located at each of the grid points. The combined set of likelihoods is based on at least the weighted likelihoods of the first set of sensors and the weighted likelihoods second set of sensors. The location of the mobile tag 101 can be estimated based on the locations of the grid points corresponding with the greatest weighted likelihoods of the combined set of likelihoods.

Figure 2:
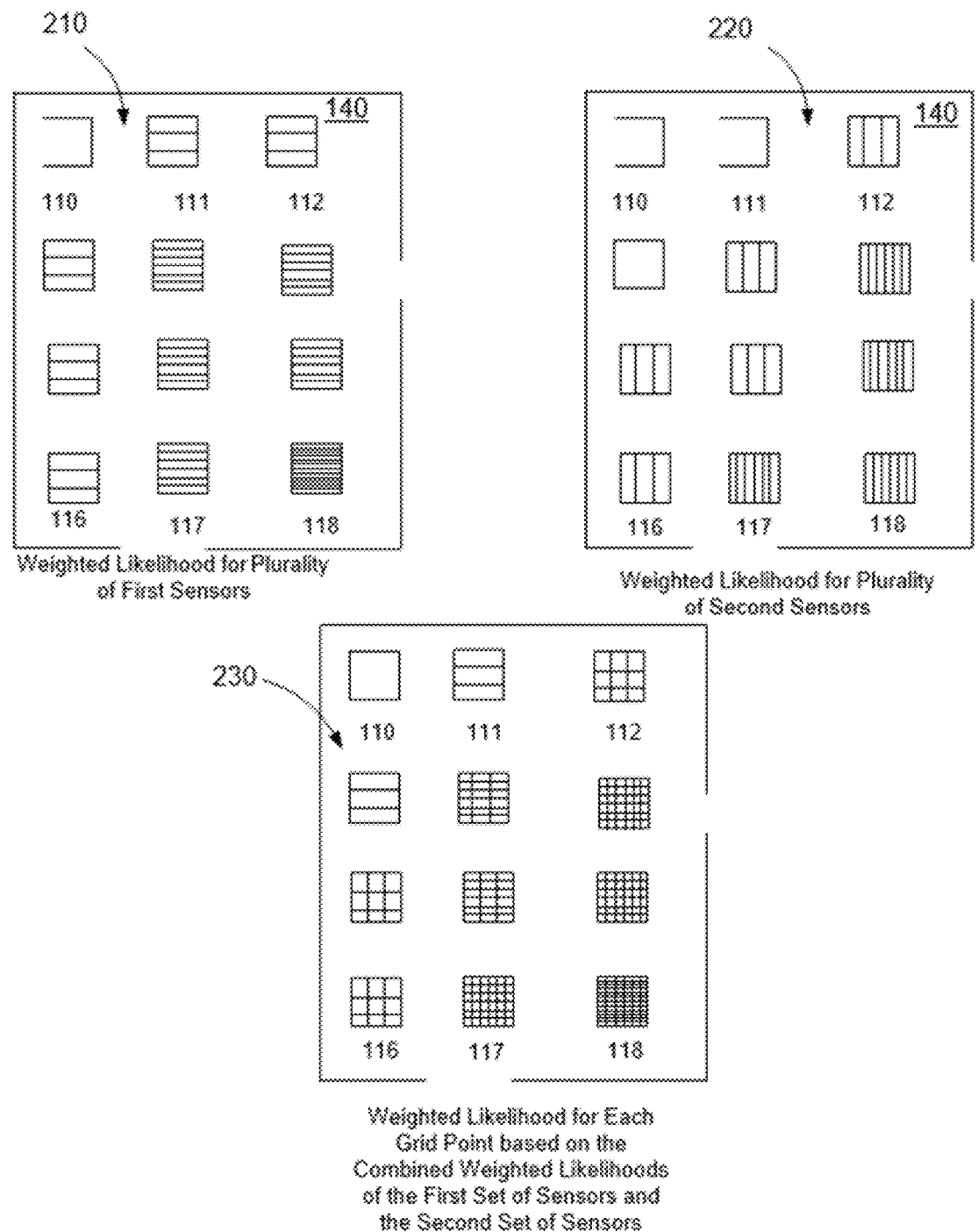
FIG. 2 shows maps of weighted likelihoods for the first set of sensors and for the second set of sensors, and a combined weighted likelihood map based on the maps of the weighted likelihoods for the first set of sensors and for the second set of sensors.

FIG. 2 shows maps 210, 220 of weighted likelihoods for the first set of sensors and for the second set of sensors, and a combined weighted likelihood map 230 based on the maps 210, 220 of the weighted likelihoods for the first set of sensors and for the second set of sensors. The maps 210, 220, 230 of FIG. 2 show weighted likelihoods of the mobile tag being at grid points 110, 111, 112, 116, 117, 118 and other non-referenced grid points within the room 114 of the structure.

The exemplary map 210 shows a weighted likelihood that the mobile tag is at each of the grid points based on the sensed first condition of the structure as sensed by the plurality of first sensors. This map represents a greater likelihood with more cross-hatch lines. That is, the weighted likelihood at the grid point 110 (no cross-hatching) is less than the weighted likelihood at the grid point 118 (more cross-hatching).

The exemplary map 220 shows a weighted likelihood that the mobile tag is at each of the grid points based on the sensed second condition of the structure as sensed by the plurality of second sensors. Again, this map represents a greater likelihood with more cross-hatch lines. That is, the weighted likelihood at the grid point 110 (no cross-hatching) is less than the weighted likelihood at the grid point 118 (more cross-hatching).

The exemplary map 230 shows the combined weighted likelihoods of the weighted likelihoods of the first sensed condition and the weighted likelihoods of the second sensed condition. As previously described, additional weighted likelihood maps can be created and included in the determination of the combined weighted likelihoods map 230.

After the combined weighted likelihoods map 230 has been created, the location of the mobile tag can be estimated based on the grid points of the combined weighted likelihoods map 230 that indicate the greatest likelihood.

Figure 3:
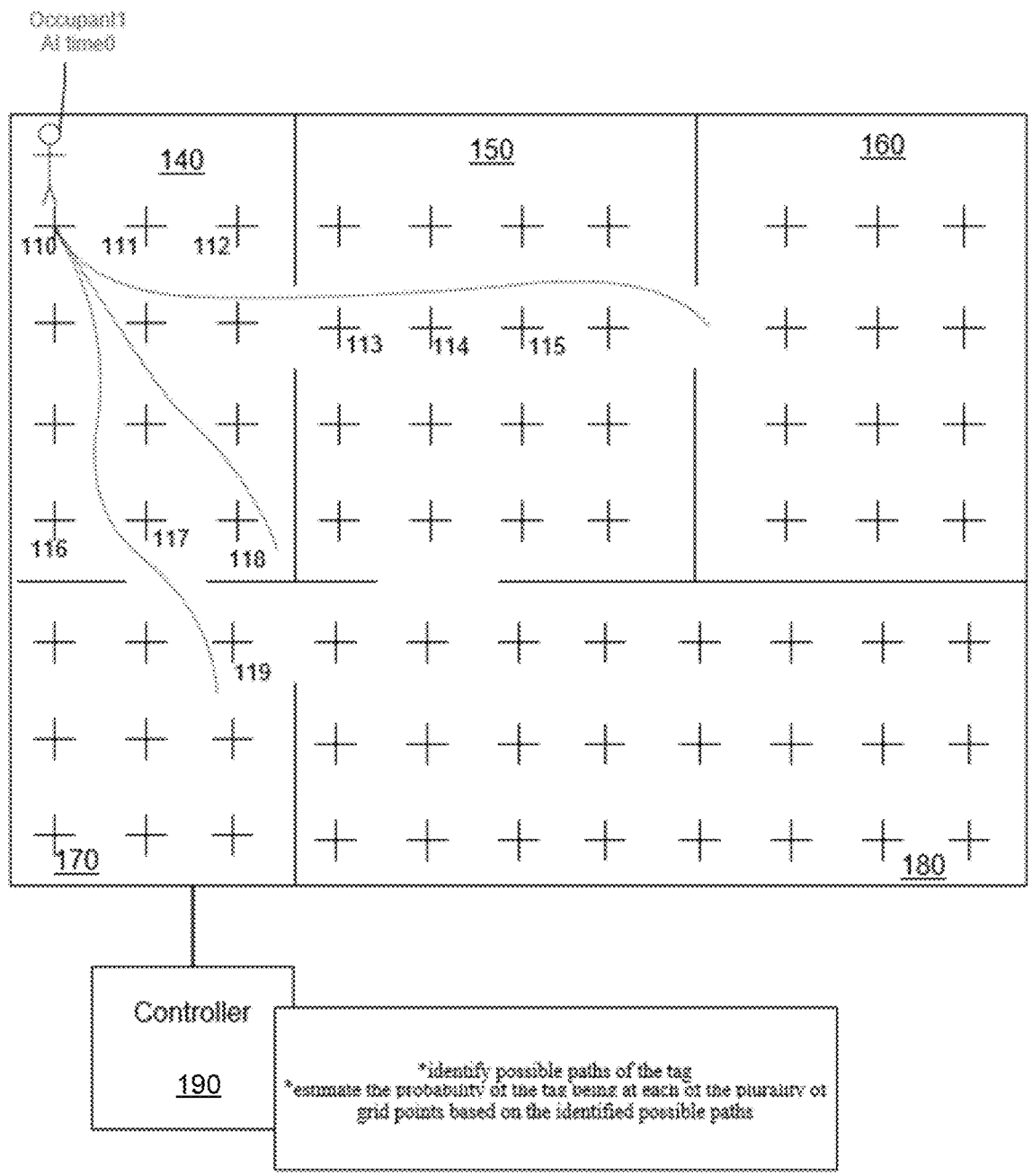
FIG. 3 shows a structure, wherein the structure is characterized by grid points and another weighted likelihood map can be created by identifying possible paths of the mobile tag, according to an embodiment.

FIG. 3 shows a structure, wherein the structure is characterized by the grid points and another weighted likelihood map can be created by identifying possible paths of the mobile tag 101, according to an embodiment. As shown, the exemplary structure includes the rooms 140, 150, 160, 170, 180. Further, as shown, the structure includes the grid points (such as, grid points 110, 111, 112, 113, 114, 115, 116, 117, 118, 119) at various locations within the structure. For at least some embodiments, an occupant or user of the mobile tag (for example, as depicted at time t0) is located at a location (such as defined by grid point 110). For at least some embodiments, the occupant possesses (or is attached to) the previously described mobile tag 101. For descriptive purposes, the term occupant and mobile tag may be used interchangeably. For at least some embodiments, the likelihood that the occupant is located at another grid point in the future is estimated. Many factors can be utilized in the estimation.

For an embodiment, the controller 190 associated with the structure performs the estimating. While shown as a single controller 190, it is to be understood that the processing of the depicted controller 190 can be performed by a distributed set of processors. Further, the process may be performed remotely.

For an embodiment the controller 190 is operative to determine an initial location of a tag at an initial time, determine a floor plan of a structure, and estimate a probability (likelihood) that at a future point in time that the tag is located at each of a plurality of grid points, wherein each of the plurality of grid points is associated with a different location within the structure. For at least some embodiments, estimating the probability (likelihood) that at the future point in time that the tag is located at each of the plurality of grid points, includes identifying possible paths of the tag, estimating the probability of the tag being at each of the plurality of grid points based on the identified possible paths, a difference between the future point in time and the initial time, and a distance between the initial position and positions of each of the plurality of grid points.

For at least some embodiments, the controller 190 further operates to generate the combined set of likelihoods based on the first set of weighted likelihoods, the second set of weighted likelihoods, and the third set of weighted likelihoods. That is, for example, a third weighted likelihood map is generated, and this third map is additionally used in the determination of the combined set of likelihoods.

Figure 4:
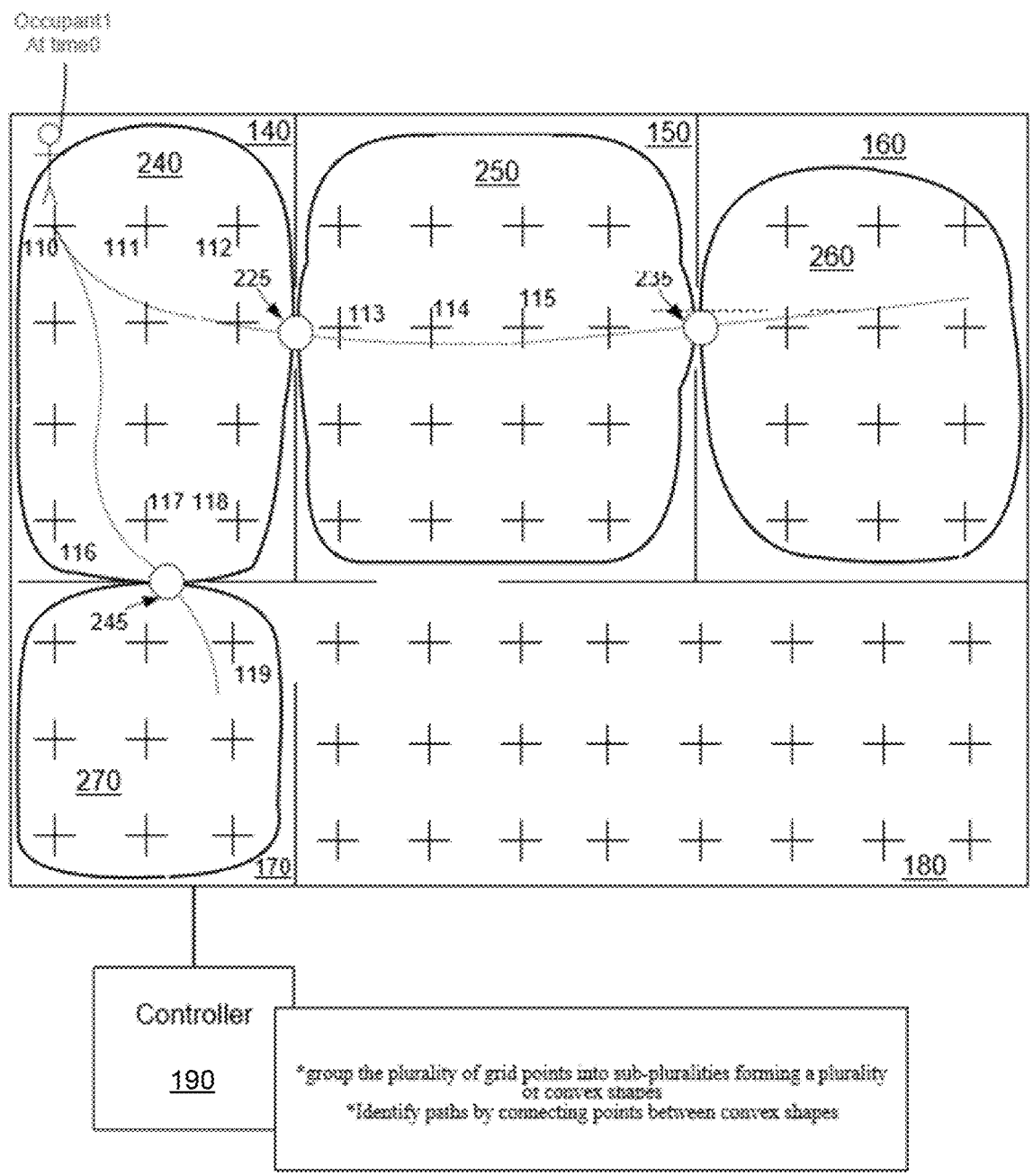
FIG. 4 shows a structure, wherein the structure is characterized by convex shapes that include grid points, according to an embodiment.

FIG. 4 shows a structure, wherein the structure is characterized by convex shapes that include the grid points, according to an embodiment. As shown, the barriers or walls of the structure define areas in which possible paths of the occupant cannot cross. For an embodiment, the physical barriers or walls of the structure define convex shapes 240, 250, 260, 270, wherein each of the convex shapes includes groups of grid points. That is, for at least some embodiments, the total number of grid points within the structure and grouped into sub-groups forming a plurality of convex shapes (such as, convex shapes 240, 250, 260, 270).

Further, for at least some embodiments, estimating the probability of the tag being at each of the plurality of grid points includes estimating a probability the tag is within the convex shape associated with the grid point. As shown, for at least some embodiments, a shape of each of the plurality of convex shapes is defined by barriers of the structure, and connecting points 225, 235, 245 between each of the plurality of convex shapes 240, 250, 260, 270 are defined by openings between the barriers of the structure. Further, for at least some embodiments, each of the possible paths pass through the connecting points between the convex shapes. For an embodiment, the connecting points are used for identifying paths through the structure.

Utilizing convex shapes that include multiple grid points can substantially improve the processing needed to determine the probability that the tag is at each of the plurality of grid points. That is, calculating the probability that the tag is at each of the plurality of grid points using information from all of the grid points takes substantially more computational power than calculating the probability that the tag is at each of the plurality of grid points using information from convex shapes, thereby improving the processing of controller that is operative to calculate the probability that the tag is at each of the plurality of grid points.

At least some embodiments include providing navigation between points (locations) of the structure. For at least some embodiments, knowledge of grid points, convex shapes of the grid points, and/or connecting points between the convex shapes are used in determining navigation between locations of the structure. For an embodiment, the connecting paths are utilized for determining a shortest path between location points within the structure. For example, a user or a mobile computing device (mobile tag) of the user can submit a request to the controller for a shortest path between a present location of the user or the mobile device of the user, and a specified or desired location of the user. For an embodiment, the controller uses the connecting points of the convex shapes of the grid points to identify the shortest path between the present location of the user and the desired or specified location of the user. Using the connecting points for the determination of the shortest path rather than all of the grid points substantially reduces the processing of the controller.

That is, for an embodiment, the controller provides a user with a shortest path between points for navigation between two points. As described, the utilization of the connecting points between the convex shapes provides the ability to determine point to point navigation using less processing than is all the grid points were to be utilized.

Figure 5:
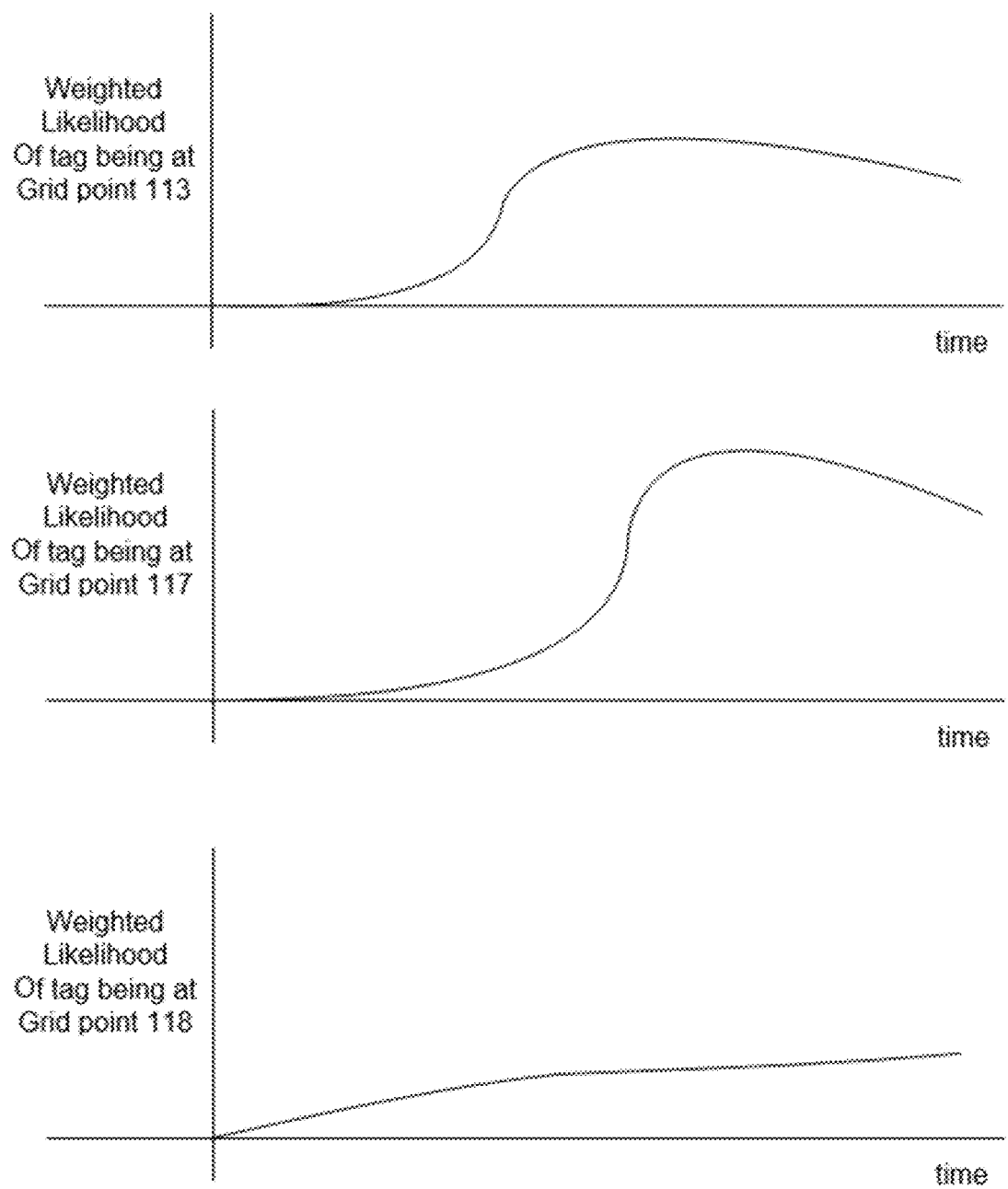
FIG. 5 shows time lines that depict estimated probabilities of a tag being located at specific grid points over time, according to an embodiment.

FIG. 5 shows time lines that depict the estimated weighted likelihood of a tag being located at specific grid points over time, according to an embodiment. For at least some embodiments, estimating the weighted likelihood that at the future point in time that the tag is located at each of the plurality of grid points 113, 117, 118, include generating the first set of weighted likelihoods based on the first sensed condition of the structure, wherein the first set of weighted likelihoods includes a weighted likelihood of the mobile tag being at each one of a plurality of grid points within the structure, generating a second set of weighted likelihoods based on the second sensed condition of the structure, wherein the second set of weighted likelihoods includes a weighted likelihood of the mobile tag being at each one of the plurality of grid points within the structure, generating a combined set of likelihoods based on the first set of weighted likelihoods and the second set of weighted likelihoods. For at least some embodiments, estimating the weighted likelihood that at the future point in time that the tag is located at each of the plurality of grid points 113, 117, 118, further includes identifying possible paths of the tag, estimating the probability of the tag being at each of the plurality of grid points 113, 117, 118 based on the identified possible paths, a difference between the future point in time and the initial time, and a distance between the initial position and positions of each of the plurality of grid points 113, 117, 118.

Figure 6:
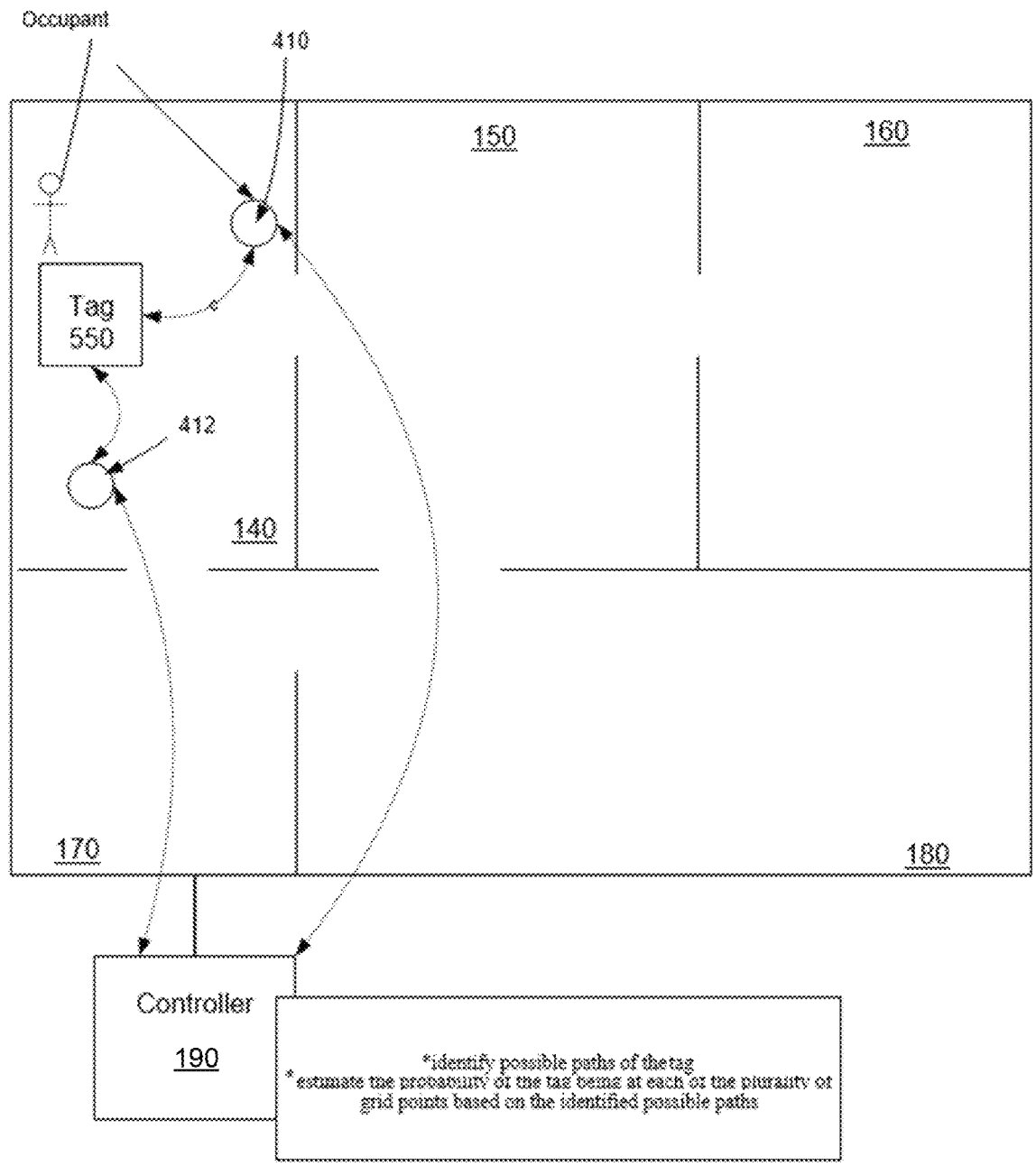
FIG. 6 shows a structure, wherein the structure includes a tag that communicates with a sensor of the structure, according to an embodiment.

FIG. 6 shows a structure, wherein the structure includes a tag 550 that communicates with a sensor 410 and/or 412 of the structure, according to an embodiment. The communication between the tag and the sensor can be facilitated by any form of communication. For an embodiment, the communication includes electromagnetic waves, such as, radio frequency (RF) or optical waves.

For at least some embodiments, the sensed parameter is associated with the tag 550. For at least some embodiments, the sensed parameter includes an estimate of a quality of a wireless link between the tag 550 and the one or more sensors 410, 412. For an embodiment, the one or more sensors include a transceiver, and the link quality includes a received signal strength indicator (RSSI) between the transceiver and the mobile tag 550. For an embodiment, the RSSI is determined by signals received by the one or more sensors from the mobile tag 550. For an embodiment, the RSSI is determined by signals received by the mobile tag 550 from the one or more sensors. For an embodiment, a distance between the mobile tag 550 and each of the sensors is approximated base on a different in signal power of transmitted signals relative to the RSSI. For an embodiment, the distance estimate between the mobile tag and each of the sensors is used to estimate the location of the mobile tag. For an embodiment, locations of each of the sensors is known, and the location of the mobile tag is estimated by triangulating using the known locations of the sensors and the estimated distance between each of the sensors and the mobile tag.

For at least some embodiments, at least one of the sensed parameters includes sensed motion of the tag. For an embodiment, sensing motion includes sensing whether are not the tag is moving. For an embodiment, sensing motion includes sensing a changing location of the tag, or detecting Significant Motion Detection of an Android virtual sensor. For an embodiment, the mobile tag includes a pedometer.

For an embodiment, the sensors (such as sensors 410, 412) include a motion sensor. For an embodiment, the motion sensor includes a passive infrared (PIR) sensor. For at least some embodiments, the sensed parameter includes sensed ambient light.

For at least some embodiments, the sensed parameter includes sensed acceleration of the tag. For an embodiment, the acceleration is sensed by the tag itself. For example, the tag can include an accelerometer that senses acceleration of the tag, which is then communicated to one of the sensors (such as, sensor 410, 412). For an embodiment, the acceleration is sensed by an external device. That is, the acceleration of the mobile tag can be sensed externally from the tag by another sensor.

For an embodiment, the acceleration is used to estimate orientation of the mobile tag with respect to gravity. Orientation of the mobile can be used to estimate expected RF strength due to antenna patterns and this expectation can be used to better calculate distance from a sensor and a probability of the distance of the tag from the sensor. For at least some embodiments, a compass and/or a gyroscope are used for orientation with respect to the earth, giving better orientation knowledge between one or more of the sensors and the mobile tag.

For at least some embodiments, orientation of the mobile tag provides information that can be used to determine how the peaks and nulls of the antenna patterns of the mobile tag alignment with one or more of the sensors. Accordingly, determinations of link qualities between the device and sensors can be more precisely determined and compensation for varying orientations of the tag and the varying antenna patterns that result due to the varying orientation of the tag. For an embodiment, the compensation improves estimates of the distance between the mobile tag and each the sensors, which can improve the location estimation of the mobile tag.

For at least some embodiments, the sensed parameter includes sensed motion of the tag, wherein the motion is sensed by the tag, and communicated to the one or more sensors. For at least some embodiments, the sensed parameter includes pedometer information from the tag. The motion sensed by the mobile tag and/or the pedometer information can be used to estimate distances traveled by the user of the mobile tag, and/or directions traveled by the user of the mobile tag. For at least some embodiments, the sensed parameter includes directional (such as, magnetic) information from the tag. For at least some embodiments, the sensed parameter includes tag orientation. Tag orientation may be delivered as a quaternion, euler angles, or rotational matrix.

For at least some embodiments, the sensed parameter includes sensed magnetic information from the tag. For at least some embodiments, the sensed magnetic information of the tag is utilized to generate magnetic mapping of the structure. For at least some embodiments, the sensed magnetic information is used to build a data base of a blue print of the structure.

Figure 7:
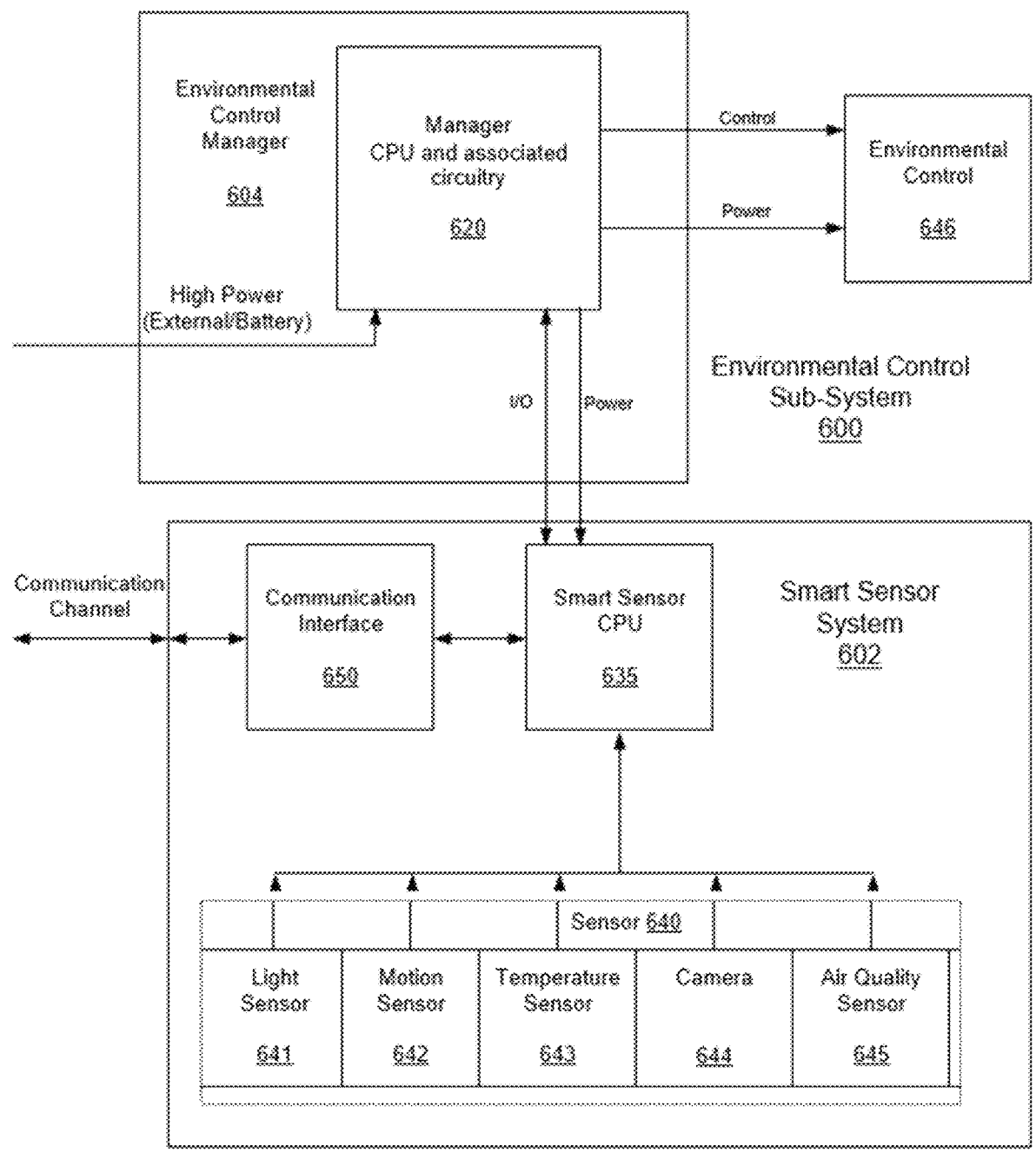
FIG. 7 shows a sensor of the structure, according to an embodiment.

FIG. 7 shows a sensor of the structure, according to an embodiment. An embodiment of a smart sensor system 602 (which operate as the previously described sensors) includes a smart sensor CPU 635, a set of sensors 640, and a communication interface 650. For an embodiment, a non-exhaustive list of sensors of the set of sensors 640 includes a light sensor 641, a motion sensor 642, a temperature sensor 643, a camera 644, and/or an air quality sensor 645. For an embodiment, the smart sensor system 602 along with an environmental control manager 604 provide and environmental control sub-system 600.

For at least some embodiments, one or more of the set of sensors 640 is used for sensing conditions within the structure for generating the first set of weighted likelihoods based on the first sensed condition of the structure, wherein the first set of weighted likelihoods includes a weighted likelihood of the mobile tag being at each one of a plurality of grid points within the structure, and generating a second set of weighted likelihoods based on the second sensed condition of the structure, wherein the second set of weighted likelihoods includes a weighted likelihood of the mobile tag being at each one of the plurality of grid points within the structure. As described, for at least some embodiments, the weighted likelihoods are used for estimating a location of the mobile tag.

For at least some embodiments, the estimated locations of the mobile tag are used for controlling an environmental condition of the structure. That is, knowing the locations (or estimates of the locations) of mobile tags and the users associated with the mobile tags allows for intelligent control of the environment of the structure. For example, areas of the structure that do not include any occupants (users) can have lights dimmed or turned off. Further, rooms with no occupants or a large number of occupants can be temperature (through, for example, an HVAC (heating, ventilation, and air conditioning) system of the structure) controlled accordingly.

For at least some embodiments, one or more of the set of sensors 640 are used for the sensing conditions which are additionally used to control the environment (for example, lighting control and or HVAC (heating, ventilation, and air conditioning) of the structure. That is, for an embodiment, the environment of the structure is controlled by both the predicted location of the mobile tag (which typically include many mobile tags) and sensed conditions of the smart sensor system 602. For example, if a large number of mobile tags are identified to be location within a common room of the structure, the temperature of the room can be adjusted lower for comfort or energy savings. Additionally, or alternatively, the lighting of the room can be adjusted up or down.

The communication interface 650 of the smart sensor system provides a communication channel for communicating with other smart sensors, with mobile tags, or with a backend server (such as, controller 190). The communication can include RF (radio frequency) communication, such as, WiFi or Bluetooth wireless communication.

The smart sensor CPU 635 provides intelligent control of the smart sensor system 602 by managing the communication and for some embodiments providing at least a portion of the location determination of the mobile tag(s).

The environmental control manager 604 which includes a managing CPU 620 receives control information from the smart sensor system 603 and provides control of an environmental control unit 646. For an embodiment, the environmental control unit 646 includes an HVAC (heating, ventilation, and air conditioning) system. For an embodiment, the environmental control unit 646 includes lighting control. For an embodiment, the environmental control unit 646 includes HVAC (heating, ventilation, and air conditioning) and lighting control.

Figure 8:
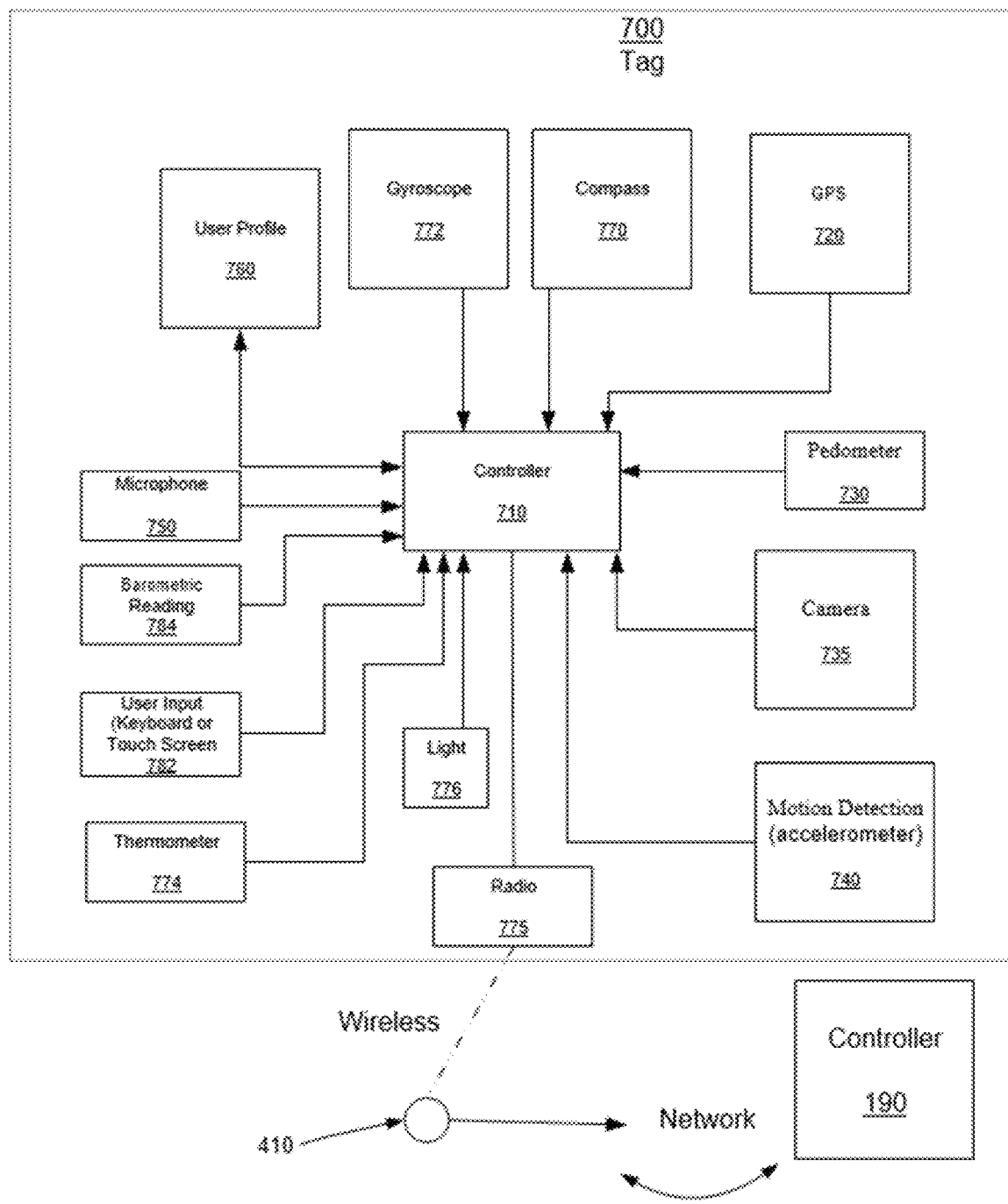
FIG. 8 shows a tag associated with an occupant of the structure, according to an embodiment.

FIG. 8 shows a mobile tag 700 associated with an occupant of the structure, according to an embodiment. As previously described, for at least some embodiments, the mobile tag 700 provides sensed information that can be additionally used to estimate a location of the mobile tag 700 within the structure. For an embodiment, the sensed information of the mobile tag 700 is used to generate another set of weighted likelihoods, wherein the set of weighted likelihoods includes a weighted likelihood of the mobile tag 700 being at each one of a plurality of grid points within the structure.

For an embodiment, the sensed information of the mobile tag 700 is communicated to the controller 190, to aid in location determination of the mobile tag 700. For an embodiment, the mobile tag 700 communicates with a sensor 410 which is connected to an upstream network that includes the controller 190.

As shown, for at least some embodiments, the mobile tag 700 includes a controller 710 that manages the sensed information and manages communication of the tag through, for example, a radio 775.

For at least some embodiments, a non-exhaustive list of sensors of the mobile tag includes a GPS (global positioning system) receiver 720, a pedometer 730, a camera 735, a motion detector 740, a microphone 750, a compass 770, a gyroscope 772, a barometric sensor 784, a thermometer 774, and/or a light sensor 776.

Further, for at least some embodiments, the mobile tag 700 includes a user profile 760 which can include customized information associated with the user of the mobile tag 700. The customized information can include tendencies and preferences of the user which can be used to further aid the location estimation of the mobile tag, and/or can be used to communicate preferential environmental control information which can be used along with the location estimation of the tag to control the environment of the structure in which the mobile tag is located.

Further, the mobile tag 700 can include a user input 782 (such as, a keyboard or touchscreen) to allow a user of the mobile tag to provide feedback information or user preferences. The feedback information of the user can be used to validate or invalidate the location estimations. For an embodiment, the user feedback influences future location estimations.

Figure 9:
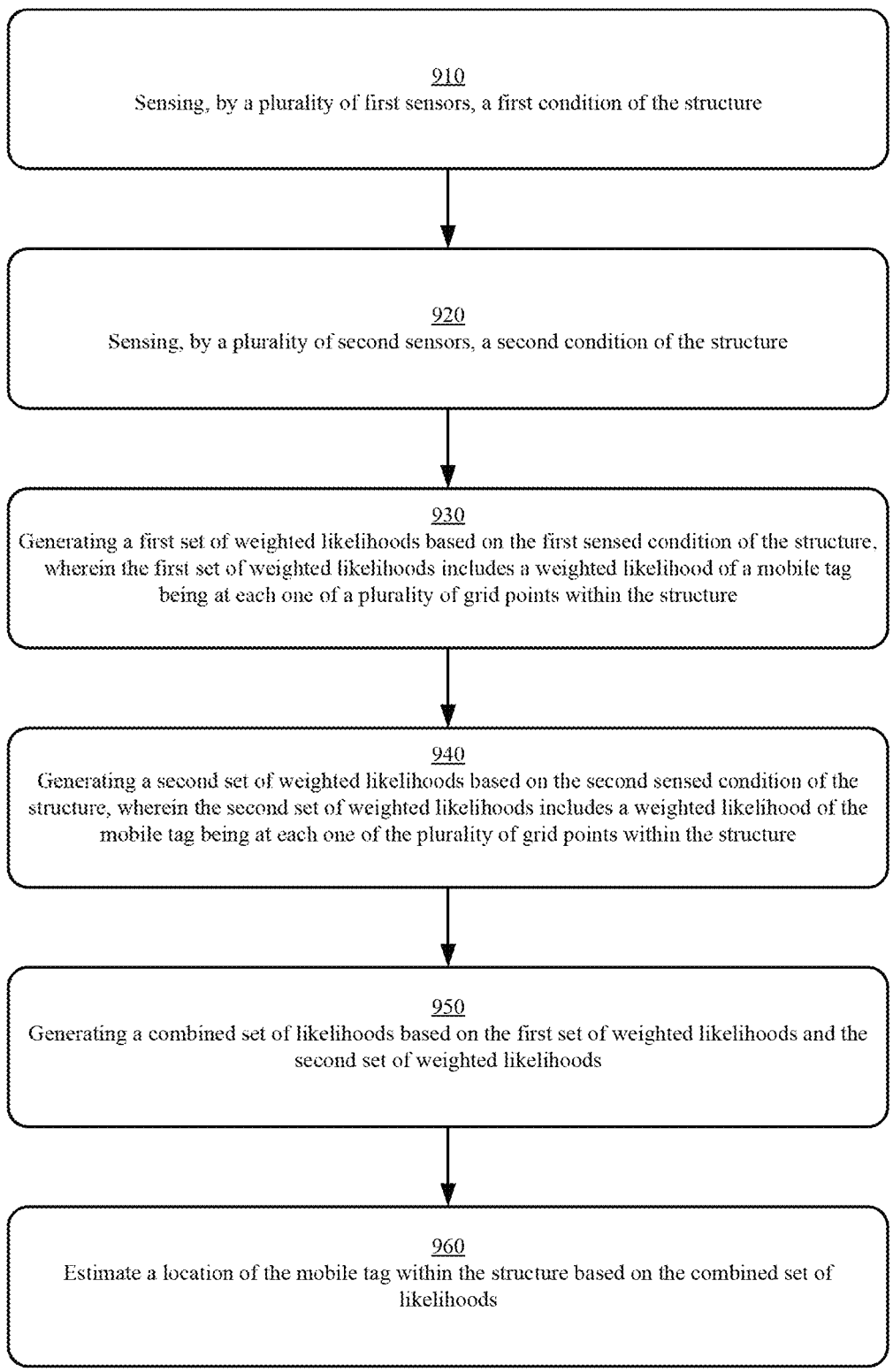
FIG. 9 is a flow chart that includes steps of a method of estimating weighted likelihood of a mobile tag being at grid points of a structure, according to an embodiment.

FIG. 9 is a flow chart that includes steps of a method of estimating weighted likelihood of a mobile tag being at grid points of a structure, according to an embodiment. A first step 910 includes sensing, by a plurality of first sensors, a first condition of the structure. A second step 920 includes sensing, by a plurality of second sensors, a second condition of the structure. A third step 930 includes generating a first set of weighted likelihoods based on the first sensed condition of the structure, wherein the first set of weighted likelihoods includes a weighted likelihood of a mobile tag being at each one of a plurality of grid points within the structure. A fourth step 940 includes generating a second set of weighted likelihoods based on the second sensed condition of the structure, wherein the second set of weighted likelihoods includes a weighted likelihood of the mobile tag being at each one of the multiple grid points within the structure. A fifth step 950 includes generating a combined set of likelihoods based on the first set of weighted likelihoods and the second set of weighted likelihoods. A sixth step 960 includes estimating a location of the mobile tag within the structure based on the combined set of likelihoods.

As previously described, for at least some embodiments, the first plurality of sensors includes motion sensors, the second plurality of sensors comprises RF sensors, and wherein the combined set of likelihoods comprises an ensemble of the first set of weighted likelihoods and the second set of weighted likelihoods.

As previously described, for at least some embodiments, the first plurality of sensors comprises passive infrared (PIR) sensors and the sensed first condition of the structure comprises sensed motion of the structure. As previously described, for at least some embodiments, the second plurality of sensors comprises wireless transceivers and the sensed second condition of the structure comprises a received signal strength of wireless signals between the mobile tag and the second plurality of sensors.

For an embodiment, the amount of motion sensed by the motion sensors (such as, the PIR sensor) influences the weighted likelihood. That is, a motion sensor that senses larger amounts of motion is more likely to be proximate to the mobile tag. Further, for an embodiment, sensed motion of different motion sensors is used to disambiguate between different mobile tags. For an embodiment, a size of an asset associated with the tag influences the weighted likelihoods. That is, a larger asset may generate a larger sensed motion signal. The larger sensed motion due to the size of the asset can be accounted for.

Figure 10:
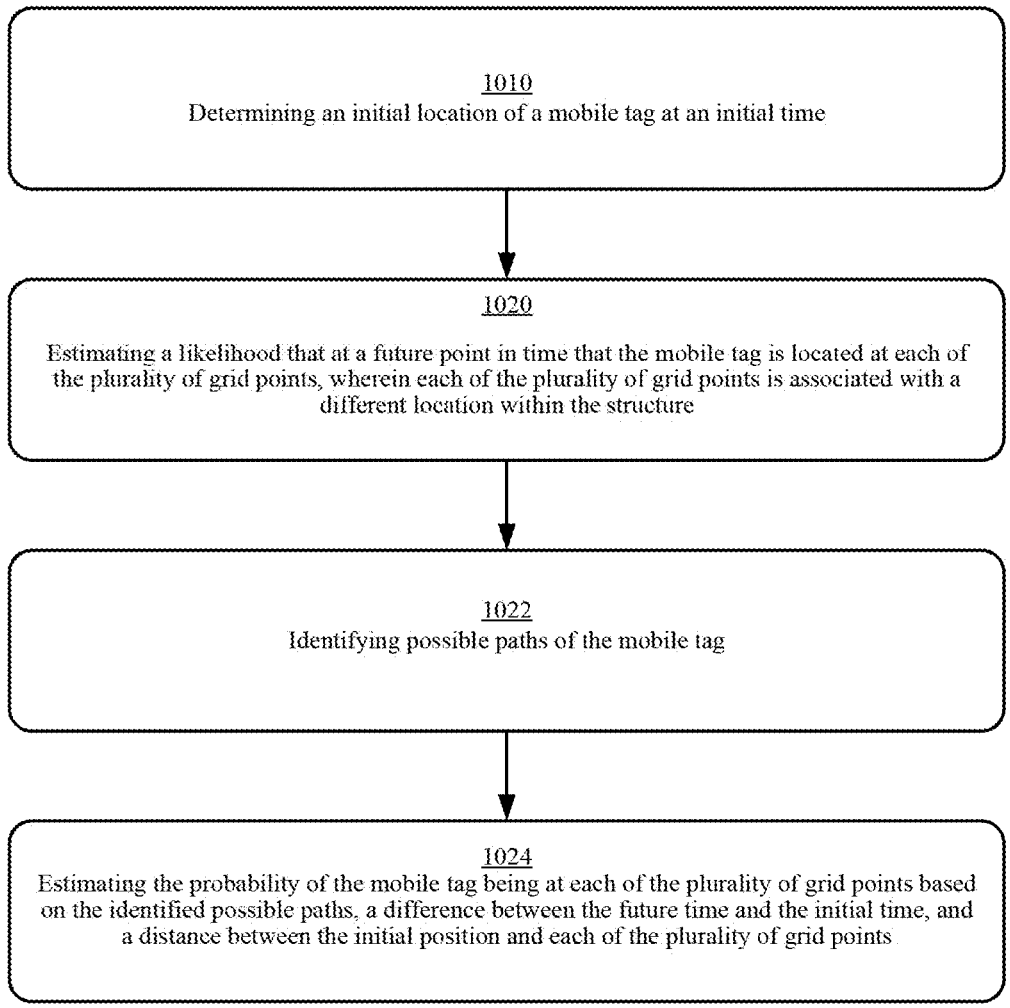
FIG. 10 is a flow chart that includes steps of a method of estimating weighted likelihood of a mobile tag being at grid points of a structure, according to an embodiment.

FIG. 10 is a flow chart that includes steps of a method of estimating weighted likelihood of a mobile tag being at grid points of a structure, according to an embodiment. A first step 1010 includes determining an initial location of the mobile tag at an initial time. A second step 1020 includes estimating a likelihood that at a future point in time that the mobile tag is located at each of the plurality of grid points, wherein each of the plurality of grid points is associated with a different location within the structure. For an embodiment, estimating the likelihood that at the future point in time that the mobile tag is located at each of the plurality of grid points includes a third step 1022 of identifying possible paths of the mobile tag, and a fourth step 1024 of generating a third set of weighted likelihoods of the mobile tag being at each of the plurality of grid points based on the identified possible paths, a difference between the future point in time and the initial time, and a distance between the initial position and positions of each of the plurality of grid points. For at least some embodiments, the grid points are equally spaced are substantially equally spaced throughout at least a portion of the structure.

Further, at least some embodiments include generating the combined set of likelihoods based on the first set of weighted likelihoods, the second set of weighted likelihoods, and the third set of weighted likelihoods.

For an embodiment, determining the initial location of the mobile tag at the initial time includes identifying when the user of the mobile tag enters the structure. The initial location is the entry point of the user.

For an embodiment, determining the initial location of the mobile tag at the initial time includes selecting a location based on the RSSI, without considering building walls constraints. Room level location consistency is used to select the initial location. That is, the number of times the RSSI indicates the tag is within a specific room of the structure can be used as an initial location determination.

For an embodiment, determining the initial location of the mobile tag at the initial time includes the user of the mobile device proactively sending a message that indicates an initial location of the user of the mobile tag. The initial location and the timing can be communicated, for example, to the controller 190.

As previously described, for an embodiment, the controller further operates to group the plurality of grid points into sub-pluralities forming a plurality of convex shapes, wherein each of the sub-pluralities of grid points define a convex shape within the structure, and wherein estimating the likelihood of the tag being at each of the plurality of grid points comprises estimating a likelihood the tag is within the convex shape associated with the grid point. As previously described, for an embodiment, a shape of each of the plurality of convex shapes is defined by barriers of the structure and connecting points between each of the plurality of convex shapes are defined by openings between the barriers of the structure. As previously described, for an embodiment, each of the possible paths pass through the connecting points between convex shapes.

For at least some embodiments, the controller further operates to generate a fourth set of weighted likelihoods based on a physical shape of the structure or characteristics of the structure and generate the combined set of likelihoods based on the first set of weighted likelihoods, the second set of weighted likelihoods, and the fourth set of weighted likelihoods. For at least some embodiments, the physical shape of the structure includes the physical shape and characteristics (such as, unique wall structure and/or materials) of the structure. For at least some embodiments, the physical shape of the structure includes the fourth weighted likelihood of each grid points being influenced by a proximity of grid point to walls. For at least some embodiments, the physical shape of the structure includes the fourth weighted likelihood of each grid points being influenced by detection of multipath signals within the structure. For at least some embodiments, the physical shape of the structure includes the fourth weighted likelihood of each grid points being influenced by determination of RF signal attenuation within the structure.

As previously described, for an embodiment, the controller further operates to receive a parameter sensed by the mobile tag. As previously described, for an embodiment, the parameter includes sensed acceleration of the mobile tag. As previously described, for an embodiment, the parameter comprises pedometer information from the tag. As previously described, for an embodiment, the parameter comprises directional (for example, magnetic) information from the tag. As previously described, for an embodiment, the parameter includes sensed magnetic information from the tag. As previously described, for an embodiment, the sensed magnetic information of the tag is utilized to generate magnetic mapping of the structure. As previously described, for an embodiment, the magnetic information is used to build a data base of a blue print of the structure.

While RSSI has been described as a method for determining distances between the mobile tag and the sensors, for at least some embodiments, ambient light sensor and other combinations of sensors other than RSSI/beacons are used for determining the distances. For an embodiment, a bi-direction BLE (Bluetooth enabled) radio of the magnetic tag is operative to both send and receive beacons from the sensor. For at least some embodiments, the mobile tag transmits tag beacons which are received by the sensors. For at least some embodiments, transmit power of the tag beacons is varied over time. Using lower transmit power reduces the number of sensors that will receive the message, which can provide greater location accuracy.

For an embodiment, a floor plan of the structure is either previously known or is provided. For an embodiment, the floor plan in deduced, for example, by the controller 190 over time by sensing or tracking motion of tags/occupants over time. Walls, for example, can be identified because mobile tags never travel through walls.

For an embodiment, motion sensors, such as, PIR (passive infrared) sensors are used to time synchronized the sensors which can be used to aid the previously described triangulation.

General Architecture of Combining Likelihood Maps

Figure 11:
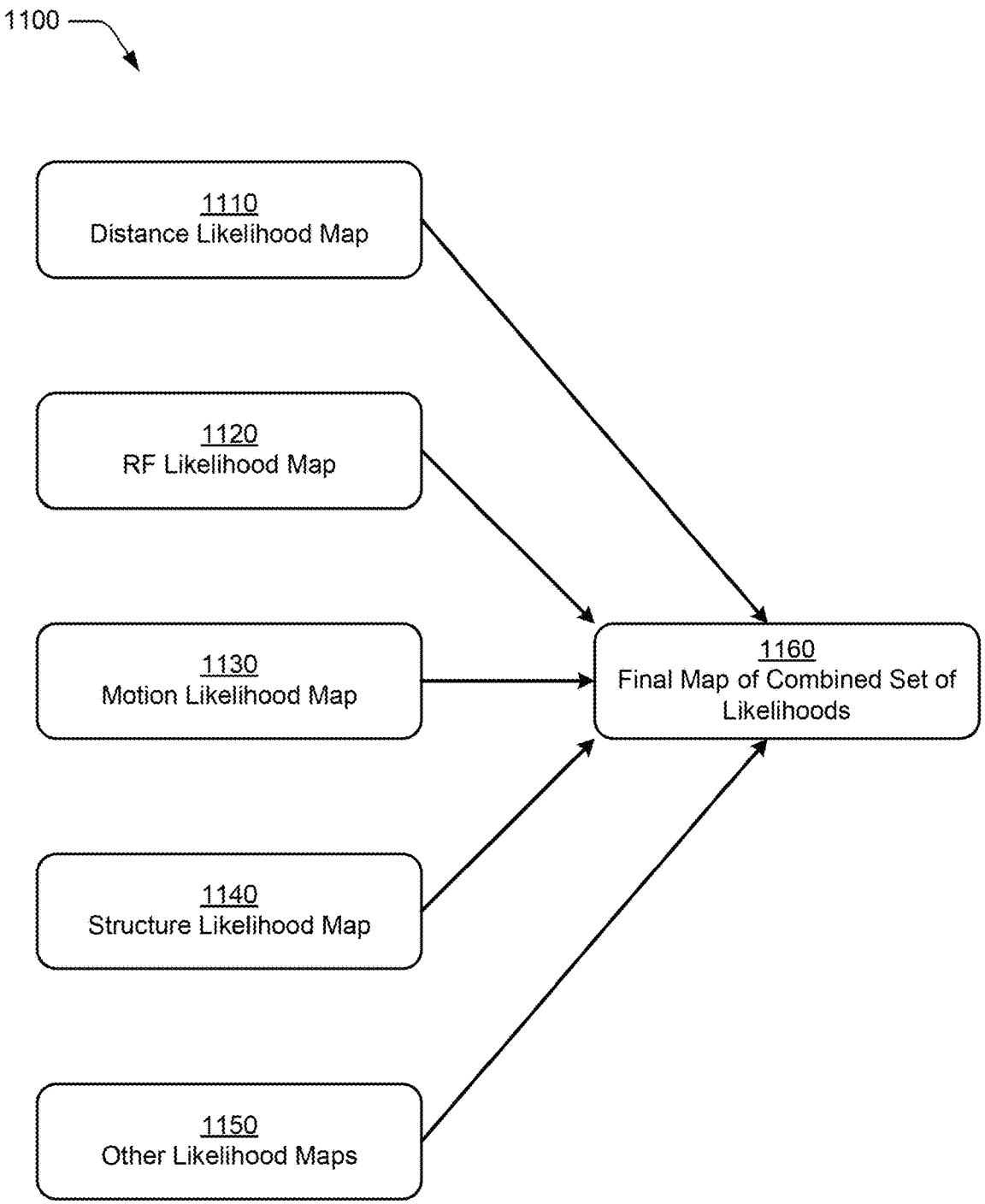
FIG. 11 is a diagrammatic view illustrating a technique for combining two or more likelihood maps for the purpose of determining a location of a mobile tag within a structure in accordance with the present invention.

Referring to FIG. 11, there is illustrated a technique 1100 of a location determining system for combining multiple likelihood maps for the purpose of determining a location of a mobile tag within a structure, particularly an indoor structure or an outdoor structure without a positioning system (such as a global positioning system). Examples of the location determining system include, but are not limited to, the environmental control sub-system 600 shown in FIG. 7 and described above in reference to this figure. For example, the location determining system may be the environmental control manager 604, the smart sensor system 602, or a combination of the manager and the system. The technique 1100 determines the location of a mobile tag by generating multiple different likelihood maps and combining them to maximize the likelihood of identifying the true location of the mobile tag. Each likelihood map utilizes independent approaches for determining the location of the mobile tag, and the likelihood maps are combined to determine the best location. One example of a likelihood map is a distance likelihood map 1110 representing possible paths of the mobile tag and probabilities of the mobile tag taking the possible paths. Another example is a radio frequency ("RF") likelihood map 1120 in which multiple RF sensors are distributed throughout one or more areas of the structure and detect RF beacons transmitted by the mobile tag. Yet another example is a motion likelihood map 1130 in which multiple motion sensors are distributed throughout one or more areas of the structure and detect movement in proximity to each sensor. Still another example is a structure likelihood map 1140 in which the likelihood of a mobile tag's position or movement is based on the location of boundaries and passages within the structure. Other likelihood maps 1150, for example distance maps based on acoustic sensors, may be combined with the distance likelihood map 1110 and/or one or more of the RF, motion, and structure likelihood maps 1120, 1130, 1140 to determine the most likely location of the mobile tag within the structure.

Any two likelihood maps 1110-1150 may be combined by the location determining system to generate a final map 1160 of combined set of likelihoods. For one embodiment, a distance likelihood map may be combined with an RF likelihood map based on received signal strength indicator ("RSSI") sensors receiving beacons from the mobile tag. For another embodiment, a distance likelihood map may be combined with a motion likelihood map based on passive infrared sensors detecting motion within a structure. Further embodiments include other combinations of the distance likelihood map being combined with one or more other likelihood maps in order to determine the true location of the mobile tag accurately.

Distance Likelihood Map

The location determining system determines a first location of a mobile tag within the structure and various second locations within the structure distributed throughout the structure. The mobile tag may be positioned at the first location within a structure, and the structure may include two or more second locations. The location determining system may maintain, at a memory component or other storage-capable component, the floor plan of the structure, and the second locations of the structure may be distributed throughout at least a portion of the floor plan. Examples of the second locations includes the grid points 110-119 shown in FIGS. 1, 3, and 4 and described above in reference these figures.

Figure 12:
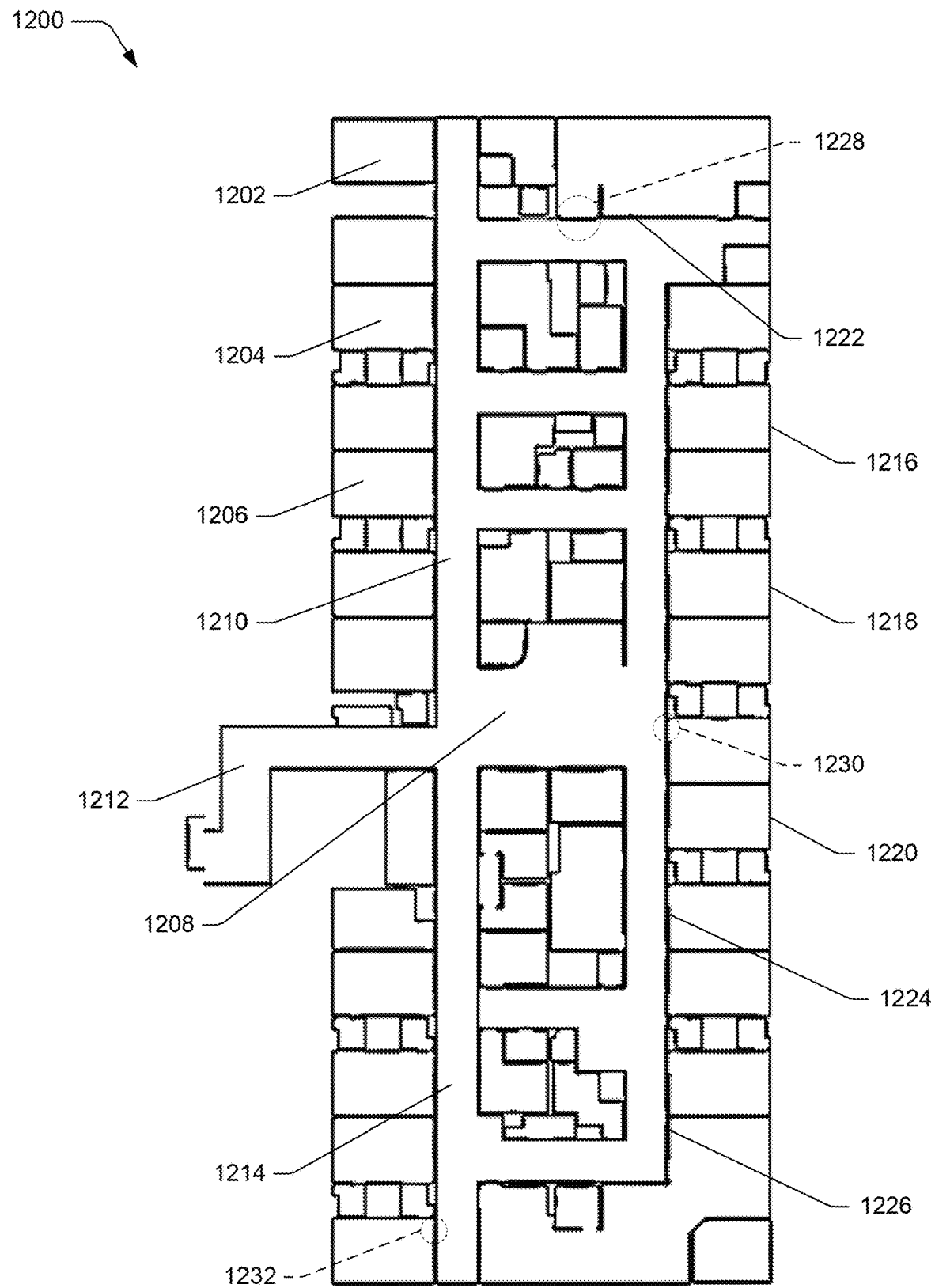
FIG. 12 is a planar schematic diagram of an example structure floor plan in which various boundaries and portals of a structure are represented.

Referring to FIG. 12, there is shown a data map, more particularly an example floor plan 1200, representing various boundaries and portals of a structure. For the example shown in FIG. 12, the boundaries and portals of the floor plan 1200 are substantially defined by straight lines. The floor plan 1200 may be stored in a particular data format, such as a vector image format (e.g., scalable vector graphics (SVG) data) or non-vector image format (e.g., raster graphics). The particular data format of the floor plan 1200 may include a path description that describes the boundaries and portals. For this example, the floor plan 1200 may include various rooms 1202-1206, partially-open or partially closed areas 1208, passages 1210-1214, various outer boundaries 1216-1220, and various inner boundaries 1222-1226. The floor plan 1200 may also include various portals 1228-1232 provide ingress to and/or egress from the rooms 1202-1206, areas 1208, passages 1210-1214, and boundaries 1216-1226. It is to be understand that the embodiment of FIG. 12 is merely an example, and the location determining system may utilize any floor plan that identifies one or more boundaries and portals of the structure.

For the floor plan 1200, at least some of the boundaries may be partial boundaries, in contrast to a full boundary. A full boundary extends substantially from floor-to-ceiling. A partial boundary does not extend substantially from floor-to-ceiling, so the partial boundary includes walls, partitions, transports, and other barriers that block the passage of some common passing elements but not other common passing elements. For example, a partial boundary that extends from the floor to a mid-height level may be treated as a wall for a traversing user, and associated mobile tag, and as an open area for overhead proximal sensors mounted to the ceiling. Typical partial boundaries include, but are not limited to, partitions and glass walls. Transports are areas zoned for stairs, elevators, escalators, and other spaces designated for movement, in whole or in part, in a vertical direction. For example, a transport may provide a user, and associated mobile tag, with a passage to traverse from one floor to another floor of the structure. A transport may be treated as a full boundary or a partial boundary depending upon the arrangement of the components of the transport and/or the existence of other boundaries supporting or surrounding the transport. Likewise, the floor plan 1200 may include one or more portals that are partial portals. Similar to the boundaries, a full portal extends substantially from floor-to-ceiling whereas a partial portal does not extend substantially from floor-to-ceiling. For example, a partial portal having a small overhang may be treated as an open area for a traversing user, and associated mobile tag, and as a wall for overhead proximal sensors mounted to the ceiling.

Figure 13:
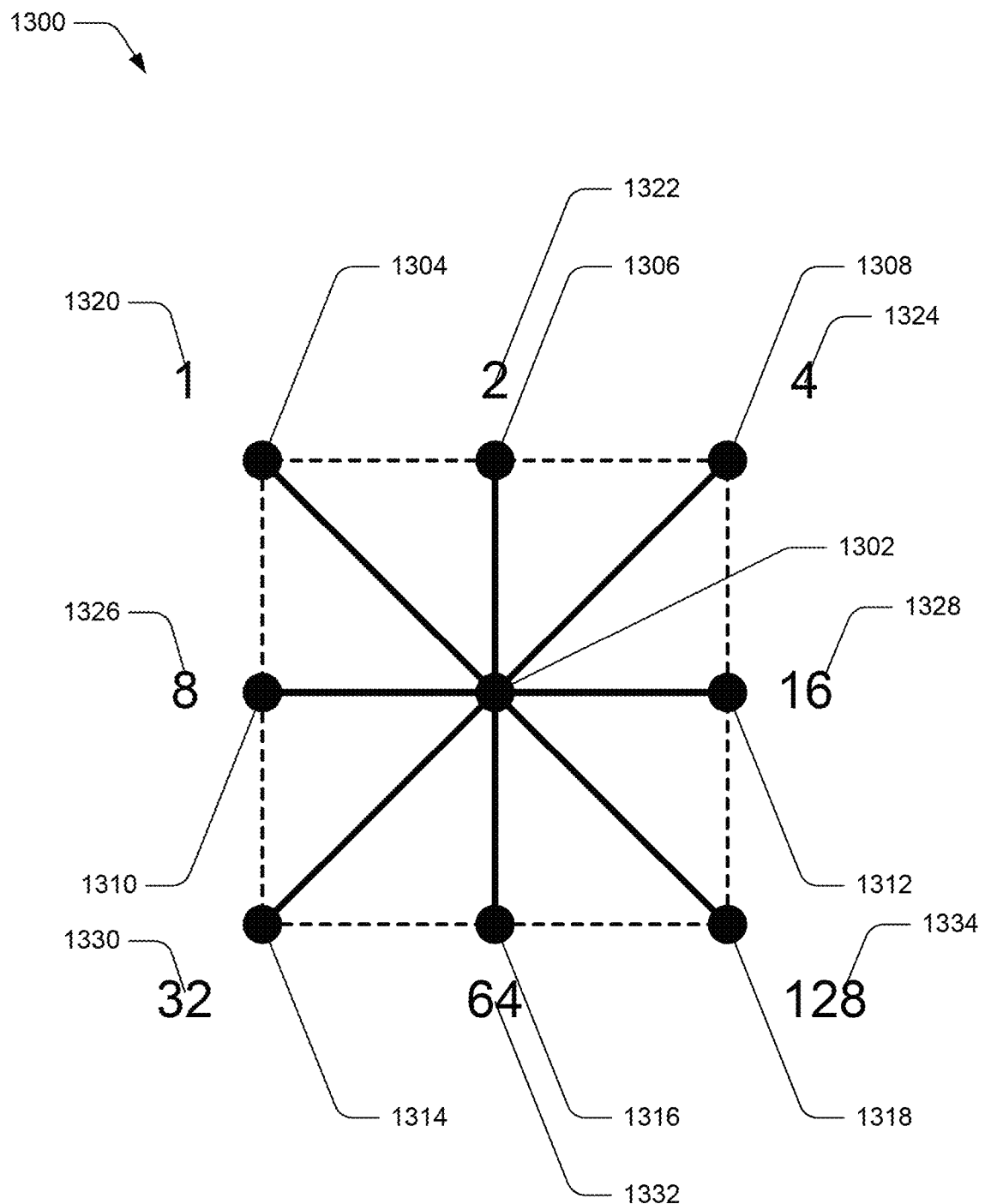
FIG. 13 is a conceptual diagram representing example values for each grid point of the structure floor plan of FIG. 12.

Referring to FIG. 13, there is shown a conceptual diagram 1300 representing example values for each map grid point 1302 of the floor plan 1200. Examples of the map grid points 1302 are represented by grid points 110-119 shown in FIGS. 1, 3, and 4 and described above in reference to these figures. The location determining system, or more particularly a controller of the system, associates each second location of multiple second locations with directional data distinguishing blocked paths from non-blocked paths.

For some embodiments, directional data for each second location, such as map grid point 1302, may include a bit set value between a minimum value (such as zero) and a maximum value (such as "255"). A minimum value represents a bit set value that may connect the map grid point 1302 to all adjacent points, such as directional grid points 1304-1318, without traversing an inner or outer boundary. A maximum value represents a bit set value that may not connect the map grid point 1302 to any adjacent points, such as directional grid points 1304-1318, without traversing an inner or outer boundary. For example, a user may not occupy or traverse an area associated with a second location having a bit set value equated with the maximum value, such as an area completely surrounded by full boundaries or outside of the structure.

For some embodiments, the bit set value for each map grid point 1302 is the sum of the bit values 1320-1334 for the map grid point. In particular, the directional grid points 1304-1318 for a map grid point 1302 have associated bit values 1320-1334, and the bit set value for the map grid point is the sum of these bit values 1320-1334. For these particular embodiments, each bit set value represents a path that is either non-blocked or blocked between adjacent points. Bit values 1320-1334 for the directional grid points 1304-1318 that is null, i.e., zero, indicates a non-blocked path between adjacent points. Likewise, bit values 1320-1334 for the directional grid points 1304-1318 that is something other than null indicates a blocked path between adjacent points. For example, the bit value 1320 of direction grid point 1304 may be "1", the bit value 1322 of direction grid point 1306 may be "2", the bit value 1324 of direction grid point 1308 may be "4", the bit value 1326 of direction grid point 1310 may be "8", the bit value 1328 of direction grid point 1312 may be "16", the bit value 1314 of direction grid point 1304 may be "32", the bit value 1332 of direction grid point 1316 may be "64", and the bit value 1334 of direction grid point 1318 may be "128".

Where all bit values 1320-1334 for the directional grid points 1304-1318 are not null, the bit set value for the map grid point 1302 is the maximum value and the direction grid points may not connect the map grid point to any adjacent points without traversing an inner or outer boundary. A bit set value between the minimum value and the maximum value indicates that some directions are blocked whereas other directions are not blocked. For example, a bit set value of 8 for the map grid point 1302 indicates that movement to the left is blocked but movement in all other directions are not blocked. It is to be noted that the bit values indicate passage in one direction, e.g., from the map grid point 1302 to each direction grid point 1304-1318, but not necessarily an opposing direction, such as a one-way passage or portal at an airport gate.

Figure 14:
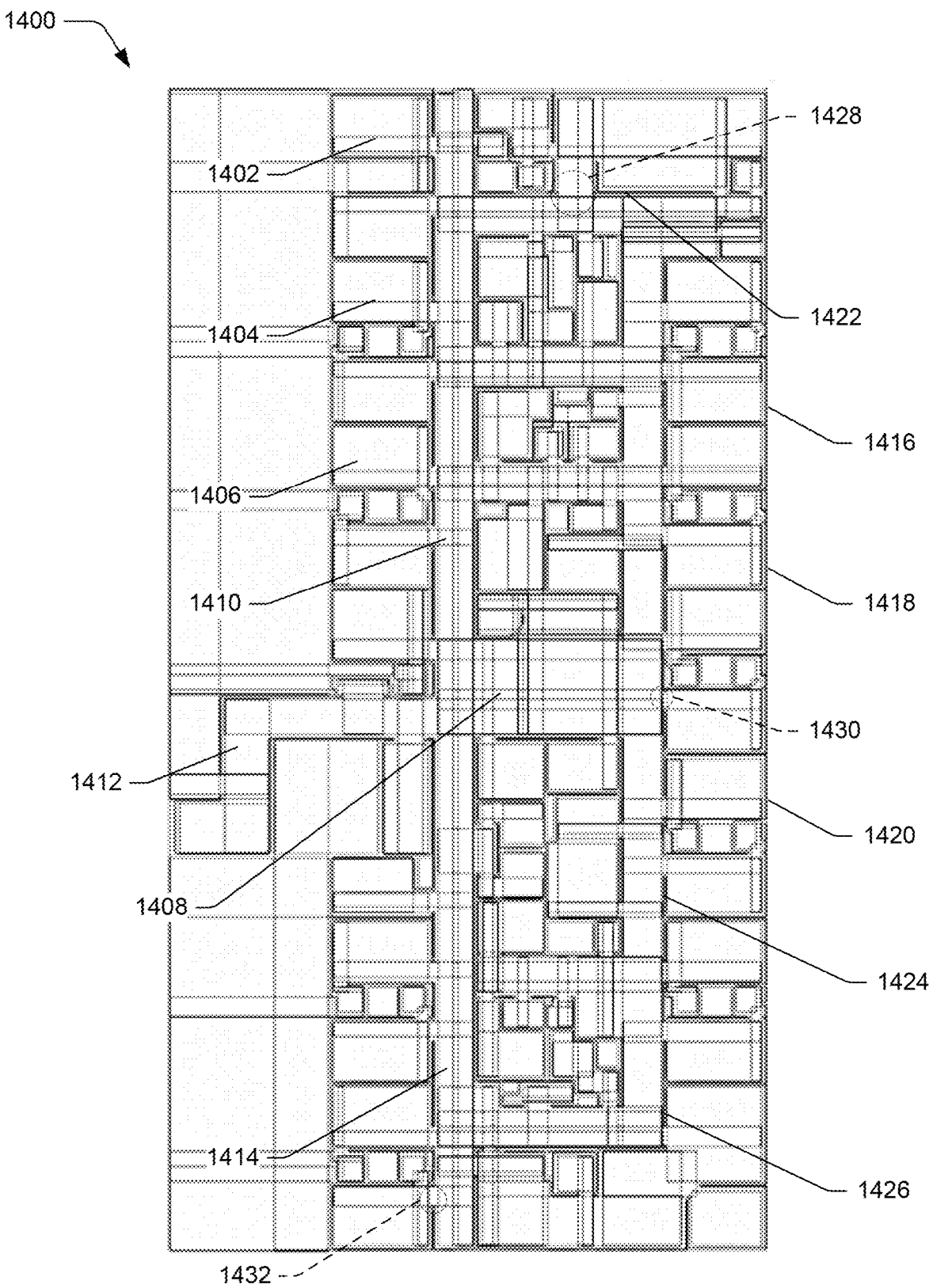
FIG. 14 is a planar schematic diagram of an example structure data map in which rectangles overlay the grid points of the structure floor plan.

Referring to FIG. 14, there is shown an example of a first modified floor plan 1400 in which various shapes overlay the grid points of the structure floor plan 1200 shown in FIG. 12. For this example, similar to the structure floor plan 1200, the first modified floor plan 1400 may include various rooms 1402-1406, partially-open or partially closed areas 1408, passages 1410-1414, various outer boundaries 1416-1420, and various inner boundaries 1422-1426. The floor plan 1400 may also include various portals 1428-1432 provide ingress to and/or egress from the rooms 1402-1406, areas 1408, passages 1410-1414, and boundaries 1416-1426. Similar to FIG. 12, the embodiment of FIG. 14 is merely an example, and the location determining system may utilize any floor plan that identifies one or more boundaries and portals of the structure.

The location determining system, or more particularly a controller of the system, associates each second location of multiple second locations with a boundary having a shape determined by the directional data. As explained above, each second location is associated with directional data, such as a bit set value for each map grid point, distinguishing blocked paths from non-blocked path. The grid points, and in particular the direction data of the grid points, are used to define overlapping shapes that may cover the grid points. For example, starting at a center of a particular grid point, the shape may be grown or expanded if movement as defined by the directional data of the grid point is allowed. In this matter, the first modified floor plan 1400 is filled with shapes, and the shapes is added to a shape list. If the dimensions and location of a particular shape is the same as the dimensions and location of an existing shape, then the particular shape is not added to the list. For the embodiment shown in FIG. 14, the various shapes are all rectangular shapes. Examples of other shapes include, but are not limited to, convex polygons and rotated rectangles.

In addition, or alternative, to covering the grid points of the structure floor plan 1200 with overlapping shapes, the location determining system may develop a second modified floor plan in which various shapes cover the grid points with non-overlapping shapes. For first modified floor plan 1400 shown in FIG. 14, there may be more than one shape covering a single grid point. For the second modified floor plan, the shapes may be shrunk such that only one shape corresponds to, or covers, each grid point. For some embodiments, the location determining system may process the second modified floor plan subsequently to determine whether adjacent shapes may be rejoined together and form a shape of interest, such as a joining two rectangles to form another rectangle. For embodiments, the location determining system may track to determine whether the shape has only a single coverage. In such case, the location determining system may skip future attempts to check intersections with the other shapes, mark the shape, or move the shape to another list. Tracked data or lists may be marked with the amount of coverage by a particular shape and, then, the particular shape may be removed from the data or list so that data or list does not need to be check at a later time.

Figure 15A:
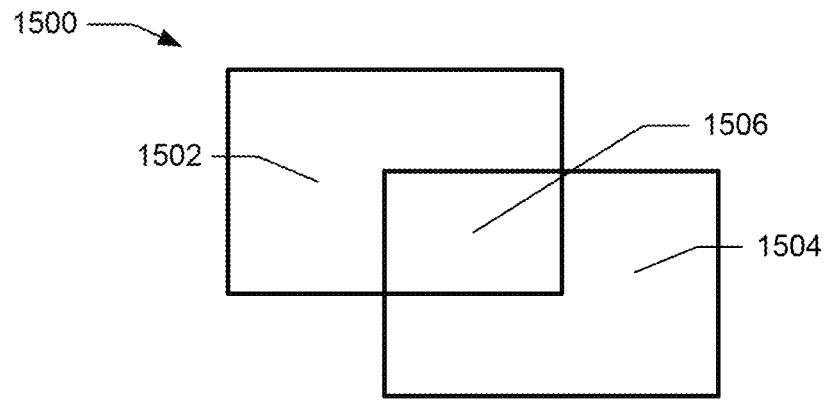
FIGS. 15A, 15B, and 15C are conceptual diagrams representing one technique for modifying rectangles of the example structure data map of FIG. 14.
Figure 15B:
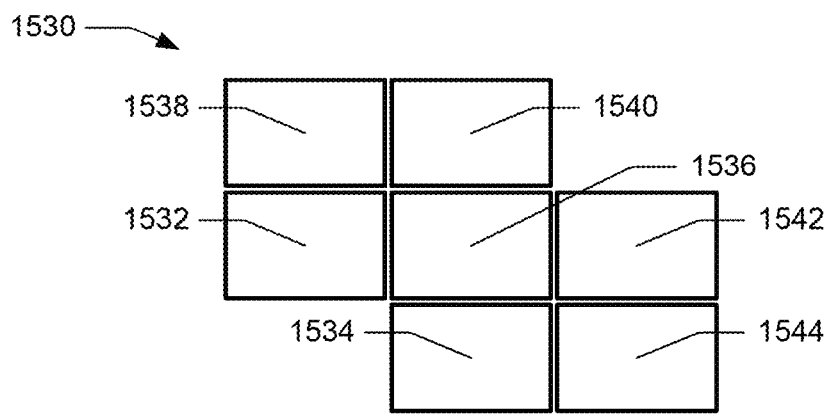
Figure 15C:
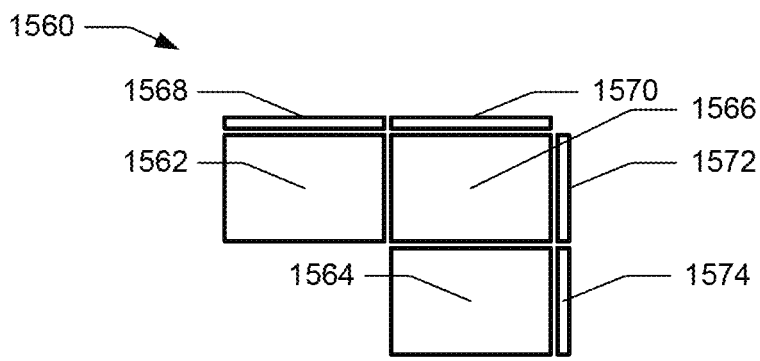

Referring to FIGS. 15A, 15B, and 15C, there are shown various shape arrangements 1500, 1530, 1560 of a technique for modifying shapes of the first modified floor plan in order to generate the second modified floor plan. Examples of shapes include, but are not limited to, rectangles (as shown in FIGS. 15A-C), convex polygons, and rotated rectangles. To shrink shapes so that only one shape corresponds to one grid point, the location determining system determines whether one shape intersects with another shape. As shown in FIG. 15A, a first shape 1502 may intersect with a second shape 1504 such that the intersecting area 1506 is common to both shapes. If an intersecting pair of shapes is identified, one or more of the shapes may be reduced in size or one or more of the shapes may be divided into multiple smaller shapes. For reducing the size of a particular shape, the shape with the smaller or smallest aspect ratio is maintained and unchanged. For these embodiments, the aspect ratio may be defined as the smaller or smallest side of the shape divided by the larger or largest side of the shape. If a quantity of x shapes is converted to a quantity of x+1 shapes, then the largest shape is maintained and unchanged.

Referring to FIG. 15B, there is shown an example shape arrangement 1530 in which two shapes are broken-up into multiple smaller shapes and, then, rejoined back together. In particular, the first and second shapes 1502, 1504 may be separated or divided into seven smaller shapes 1532-1544 occupying the same or similar total area as the first and second shapes. For some embodiments, the location determining system may identify the shapes to maintain or keep together based on the quantity of portals among the shapes. For other embodiments, the location determining system may identify the shapes to maintain or keep together based on the quantity of portals among the shapes, followed by the area covered by the shapes. For these embodiments, the shapes are rejoined to maximize the quantity of door connections and/or area of coverage.

FIG. 15C represents an example arrangement 1560 in which more than two shapes are broken-up into multiple smaller shapes and, then, rejoined back together. In particular, third, fourth, and fifth shapes may be separated or divided into seven smaller shapes 1562-1574. The same logic for breaking and rejoining may be utilized for the arrangement 1530 of FIG. 15B as the arrangement of 1560 of FIG. 15C since the same number of shapes result for the break-ups. For more than two shapes, the extra smaller shapes 1568-1574 may include zero area, shown as by the representative slivers in FIG. 15C. Although the slivers of the extra smaller shapes 1568-1574 have zero width, they are shown in FIG. 15C to be wider merely for the purpose of visualization. Similar to the arrangement 1530 of FIG. 15B, the shapes for these embodiments may rejoined based on minimized connections (i.e., maximize the quantity of door connections) and/or maximized area of coverage.

Referring again to FIG. 14, the location determining system may generate a third modified floor plan based on the first or second modified floor plans to connect certain shapes and remove outside shapes. Each shape may be adjacent and connectable, as defined by the grid point under that shape, after covering the grid points with overlapping and/or non-overlapping shapes. Each shape has a border at its outer perimeter, and connection lines are determined along the border of the shape. These connection lines indicate connections between the shapes and are maintained with each shape. A shown in FIG. 14, the connection lines are shown as thicker, black lines.

Next, the location determining system may remove all shapes located outside of the structure. Starting with a shape covering a grid point at one corner of the structure floor plan, all connecting shapes outside of the structure may be removed and the grid point corresponding to the removed shape may be marked as unreachable, for example a bit set value of 255.

Figure 16:
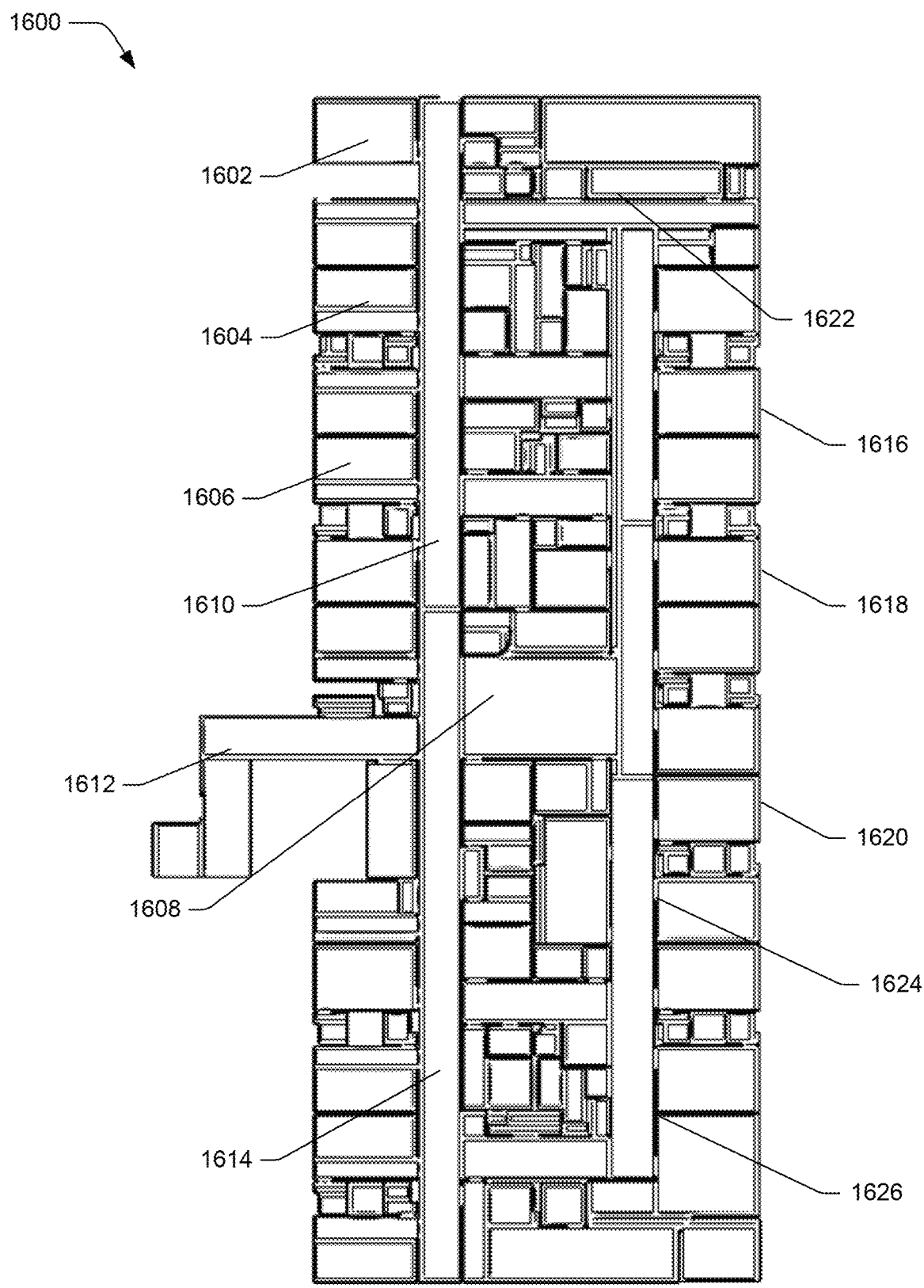
FIG. 16 is a planar schematic diagram of an example structure data map in which modified versions of the rectangles of FIG. 14 fill-in portions of a modified version of the structure data map.

Referring to FIG. 16, there is shown an example fourth modified floor plan 1600 in which modified versions of the shapes of FIG. 14 fill-in portions of the fourth modified floor plan. The fourth modified floor plan is generated from the first, second, and/or third modified floor plans by removing line segments of shapes within structure boundaries, such as walls. For example, portals and other line segments of each shape may be removed from each shape. The location determining system may then fill the fourth modified floor plan 1600 with overlapping shapes, fill the fourth modified floor plan with non-overlapping shapes, connect the shapes, and remove all shapes that don't connect to the largest shapes.

Figure 17:
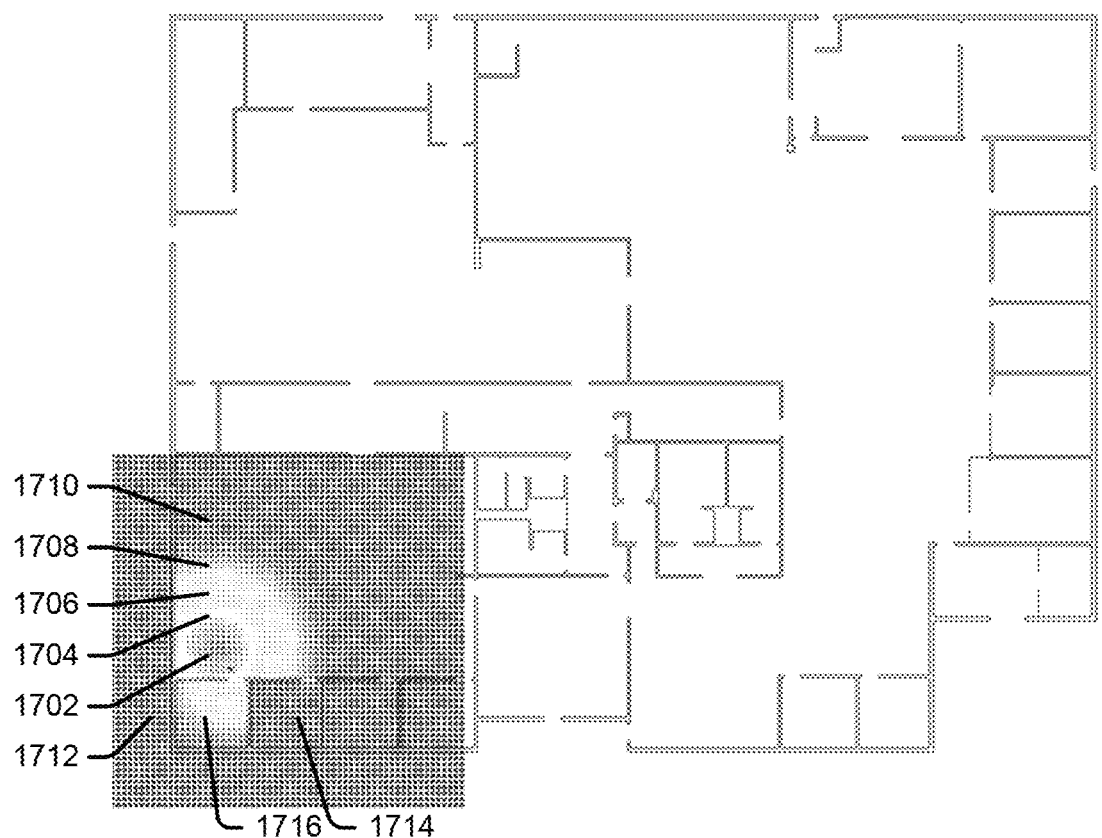
FIG. 17 is a planar schematic diagram of an example distance likelihood map in accordance with the present invention.

FIG. 17 illustrates a distance likelihood map 1700 determined by the location determining system based on the example floor plan 1200; the conceptual diagram 1300; the first, second, third, and fourth modified floor plans 1400, 1600; and the various shape arrangements 1500, 1530, 1560 described above. The location determining system determines shapes, such as rectangles, focused on covering navigable areas of the structure and how the shapes are connected. The location determining system then creates a function where varying distances, including a shortest distance, may be determined between a given grid point to other grid points. For example, the location determining system may determine and fill one shape with distances and, then, follow connecting points to determine distances into the next rectangle. This is a recursive operation as there may be more than one way to enter connected rectangles. Also, the location determining system may limit of the distances searched. For example, the distance likelihood map 1700 implements a distance is limited to a predetermined distance, such as 20 feet, going toward and/or to adjacent shapes. The distance likelihood map 1700 may determine distance from a previous estimate location to a next expected location based upon errors, walking speed, estimated walking speed.

As shown in FIG. 17, the distance likelihood map 1700 includes a center 1702 and multiple concentric rings 1704-1710 located about the center, each representing different likelihoods of a mobile tag traversing from a first location to various second locations along different possible paths within a structure. The location determining system generates a set of weighted likelihoods of the mobile tag being located at each second location of these multiple second locations based on the possible paths and distances between the first location and the multiple second locations. The center 1702 represents the area of the structure having the highest likelihood of representing the location of the mobile tag, based on the distance likelihood map 1700. The first concentric ring 1704 represents the area having the second highest likelihood, the second concentric ring 1706 represents the area having the third highest likelihood, the third concentric ring 1708 represents the area having the fourth highest likelihood, and the surrounding area 1710 beyond the third concentric ring represents the least likelihood of representing the location of the mobile tag.

The distance likelihood map 1700 also illustrates an outside area 1712 located outside of the structure, a first adjacent room 1714, and a second adjacent room 1716. The outside area 1712 appears similar to the surrounding area 1710, because the outside area is not readily accessible to the mobile tag relative to the first location. Similarly, the first adjacent room 1714 appears similar to the surrounding area 1710, because the portal of the first adjacent room is not readily accessible to the mobile tag relative to the first location. On the other hand, a portion of the second adjacent room 1716 appears similar to the second concentric ring 1706, because the portal of the second adjacent room is readily accessible to the mobile tag relative to the first location. Thus, the likelihood of the mobile tag being located at that particular portion of the second adjacent room is greater than the first adjacent room 1714 and the surrounding area 1710 but not a likely as the center 1702 or the first concentric ring 1704.

Radio Frequency ("RF") Likelihood Map

Figure 18A:
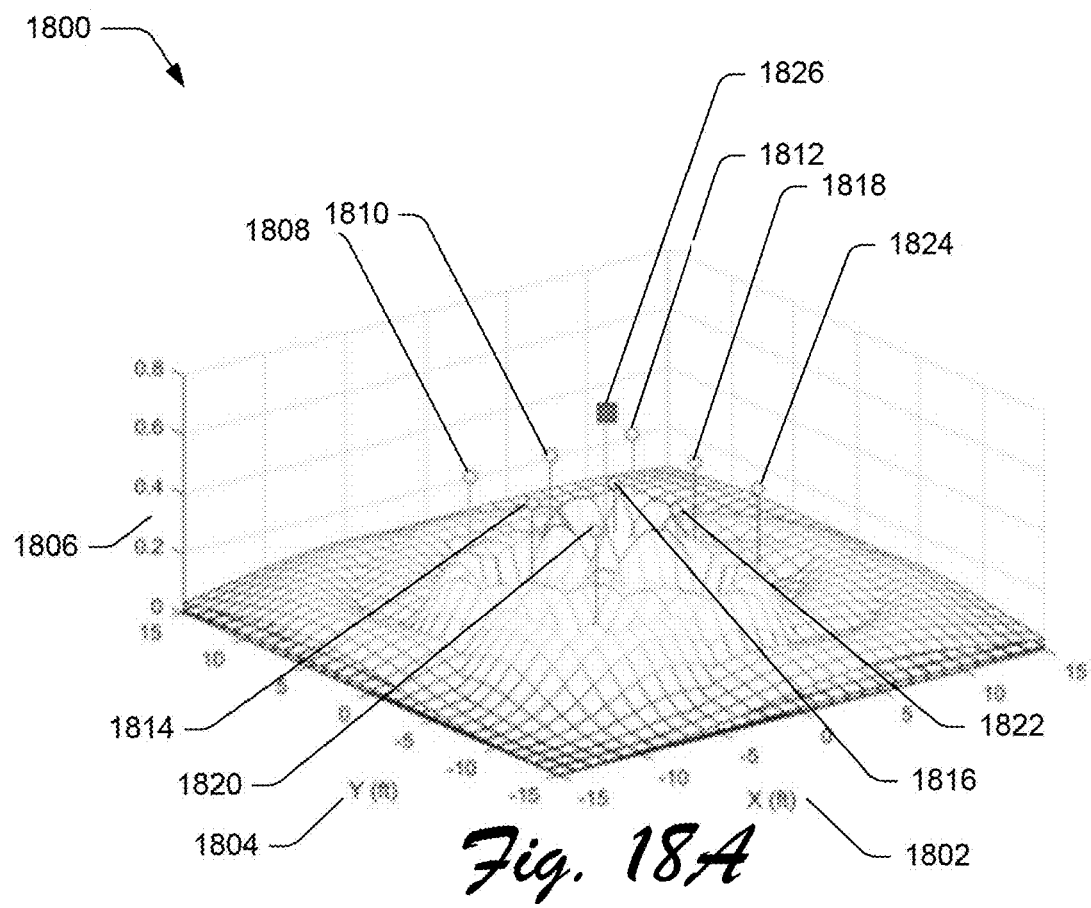
FIGS. 18A and 18B are graphic representations illustrating multiple RF sensors utilized to sense properties of a mobile tag.
Figure 18B:
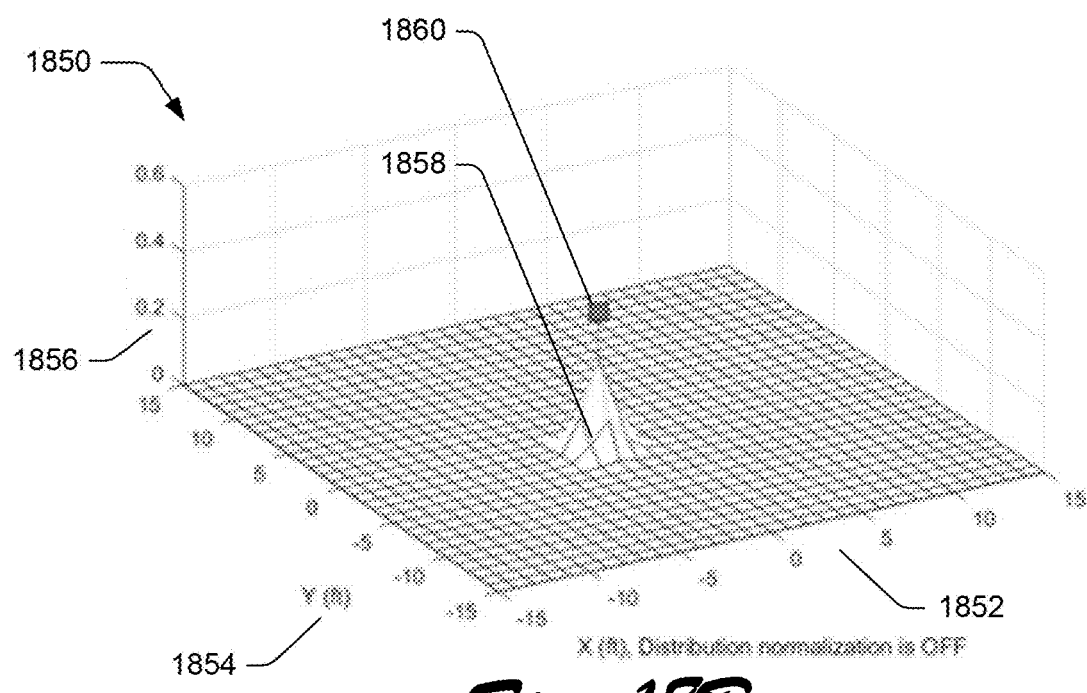

FIGS. 18A and 18B are graphic representations illustrating a scenario where multiple RF sensors are utilized to sense one or more properties of a mobile tag. The RF sensors receive a wireless signal, including a signal strength of the wireless signal, from the mobile tag. For some embodiments, the mobile tag includes a motion sensor and the RF sensors receive the wireless signal in response to the motion sensor detecting motion at the mobile tag. The controller of the location determining system generates a second set of weighted likelihoods of the mobile tag, in addition to the first set of weighted likelihoods based on the distance likelihood map, being located at each second location of the multiple second locations based on a structure condition. The RF sensors sense the structure condition based on motion detected in proximity to each sensor of the plurality of sensors.

An example of an RF sensor is a received signal strength indicator ("RSSI") sensor receiving beacons from the mobile tag. RSSI is measured in dBm and is normalized and sign reversed to move the RSSI value in a particular range. The larger the RSSI value, the smaller the actual received RSSI signal. RSSI is used to determine the distance from the mobile tag to the RF sensor. The relationship between RSSI (magnitude) and the actual distance from the mobile tag to the RF sensor is influenced by many factors, such as antenna designs (both tag and sensors); transmission frequency and channels; tag/sensor locations and environment; multipath effects; interferences, etc. In general, the greater the distance between the mobile tag and the RF sensor, the smaller the received RSSI signal (and the larger the RSSI dBm value).

A comprehensive statistical process may be used to establish the relationship between RSSI dBm and distances. The relationship may be based on a large amount of experimental data with ground truth on multiple sensor-tag networks. Examples of statistical distributions models that may be utilized include, but are not limited to, Normal, Rician, Nakagami, Lognormal, and Gamma. The empirical data may be used to train the regression model on each model and select one or more distributions to cover a large range of empirical training data with the minimum error. A lookup table may be generated for a tag network, based on the distribution training, as a matrix that correlates a distance (such as 0 to 149 ft.) and RSSI (such as 0 to 63 dBm). Accordingly, each intersection determined to be a probability value.

An RF likelihood map may be generated based on the lookup table, given the distance of each grid point on the data map to the RF sensor and the RF value. If multiple RF sensors receive RF signals, such as RSSI, from the same mobile tag, then multiple likelihood maps on the same map grid from different RF sensors may be overlaid. Also, a final RF likelihood map having a primary, or sole, peak may be developed that results in a mobile tag location determination base on RF signals. A minimum of three sensors is required to produce a unique mobile tag location determination, and the determination improves as the number of RF sensors receiving the mobile tag at a particular time increases. As a result, better tag location accuracy and robust noise suppression are generated.

As shown in FIG. 18A, the graphic representation 1800 depicts a distribution of multiple RF sensors from a mobile tag. The x-axis 1802 of the graphic representation 1800 is associated with a distance in the x direction, the y-axis 1804 is associated with a distance in the y direction, and the z-axis 1806 is associated with a signal probability. For this particular example, multiple RF sensors 1808-1824 sense one or more properties of a mobile tag 1826, and the distribution model (e.g., RSSI-distance) is assumed to be lognormal. Based on received RF signal from the mobile tag 1826, each RF sensor 1808-1824 generates its own probability density distribution map that is essentially a donut in three dimensions.

Referring to FIG. 18B, the probability maps may be overlaid, via multiplication, to determine the location of the mobile tag via the RF likelihood map. The x-axis 1852 of the graphic representation 1850 is associated with a distance in the x direction, the y-axis 1854 is associated with a distance in they direction, and the z-axis 1856 is associated with a signal probability. For this particular example, the combination of the probability maps yields a sharp peak 1858 centered around a location of the mobile tag 1860.

Figure 19A:
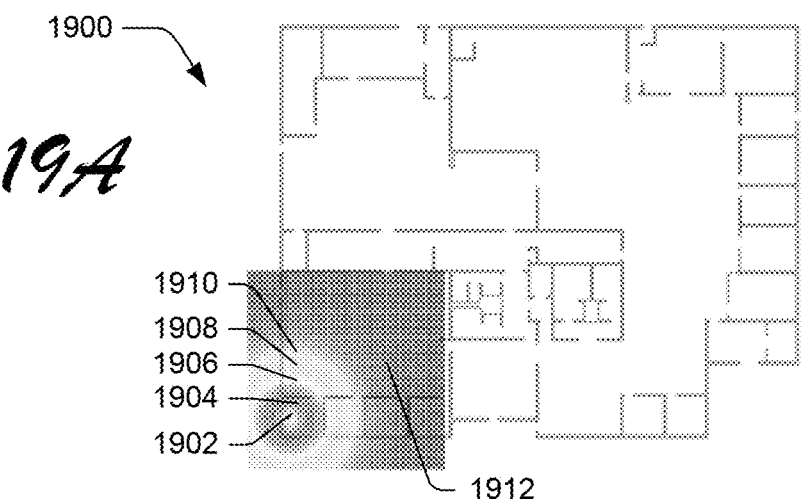
FIGS. 19A, 19B, and 19C are planar schematic diagrams of example individual RF maps of a mobile tag sensed by RF sensors.
Figure 19B:
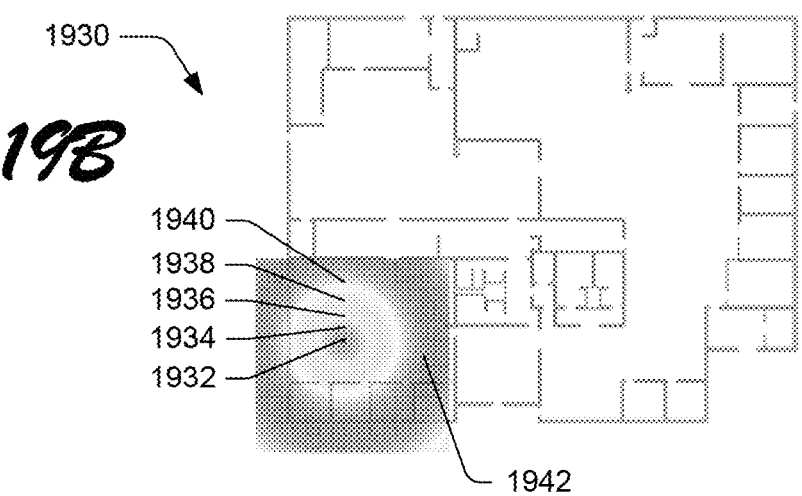
Figure 19C:
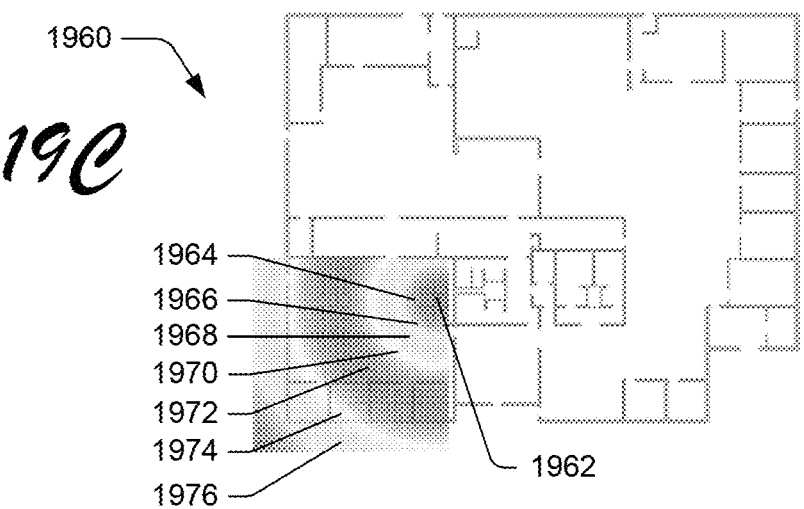

Referring to FIGS. 19A, 19B, and 19C, there are shown individual RF maps 1900, 1930, 1960 of a mobile tag sensed by individual RF sensors. Each RF map is divided into discrete points, and a likelihood of a mobile tag as being at that point is assigned. The likelihood may be assigned based upon the signal strength (RSSI) of the mobile tag and the set of RF sensors. A two-dimensional probability map may be generated based upon sensor type, tag type, distance, and RF strength. The probability map may be overlaid on a two-dimensional grid, which may appear like a circular contour map. The two-dimensional probability maps may be stacked to give an overall probability map based upon the signal strength.

As shown in FIGS. 19A, 19B, and 19C, each RF likelihood map 1900, 1930, 1960 includes a center 1902, 1932, 1962 and multiple concentric rings 1904-1912, 1934-1942, 1964-1976 located about the center, each representing different likelihoods of a determined location for the mobile tag within a structure. The location determining system generates a set of weighted likelihoods of the mobile tag being located at each second location of these multiple second locations. For FIG. 19A, the first concentric ring 1904 represents the area of the structure having the highest likelihood of representing the location of the mobile tag, based on the RF likelihood map 1900. The center 1902 and the second concentric ring 1906 represent the areas of the structure having the second highest likelihood of representing the location of the mobile tag. The third concentric ring 1908 represents the area having the third highest likelihood, the fourth concentric ring 1910 represents the area having the fourth highest likelihood, and the surrounding area 1912 beyond the fourth concentric ring represents the least likelihood of representing the location of the mobile tag. For FIG. 19B, the surrounding area 1942 beyond the fourth concentric ring represents the area of the structure having the highest likelihood of representing the location of the mobile tag, based on the RF likelihood map 1930. The fourth concentric ring 1940 represents the area having the second highest likelihood, the third concentric ring 1938 represents the area having the third highest likelihood, the second concentric ring 1936 represents the area having the fourth highest likelihood, the first concentric ring 1934 represents the area having the fifth highest likelihood, and the center 1932 represents the least likelihood of representing the location of the mobile tag. For FIG. 19C, the fifth concentric ring 1972 between the fourth and sixth concentric rings represents the area of the structure having the highest likelihood of representing the location of the mobile tag, based on the RF likelihood map 1960. The fourth and sixth concentric rings 1970, 1974 represent the areas having the second highest likelihood, the third and seventh concentric rings 1968, 1976 represent the areas having the third highest likelihood, the second concentric ring 1966 represents the area having the fourth highest likelihood, the first concentric ring 1964 represents the area having the fifth highest likelihood, and the center 1972 represents the least likelihood of representing the location of the mobile tag.

FIG. 19A, FIG. 19B, and FIG. 19C represent RF likelihood maps 1900, 1930, 1960 associated with three example RF sensors within the structure. For this example, FIG. 19A represents an RF likelihood map 1900 for a first RF sensor located near a lower left corner of the structure, FIG. 19B represents an RF likelihood map 1930 of a second RF sensor located a little further from the first RF sensor, and the FIG. 19C represents an RF likelihood map 1960 for a third RF sensor located further away from both the first and second RF sensors. As stated above, the performance of the location determining system in determining the location of the mobile tag improves as the number of RF sensors utilized for the determination increases. It is to be noted that the strongest signals detected by the RF sensor of FIG. 19A is the first concentric ring 1904, the RF sensor of FIG. 19B is the surrounding area 1942, and the RF sensor of FIG. 19C is the fifth concentric ring 1972.

Figure 20:
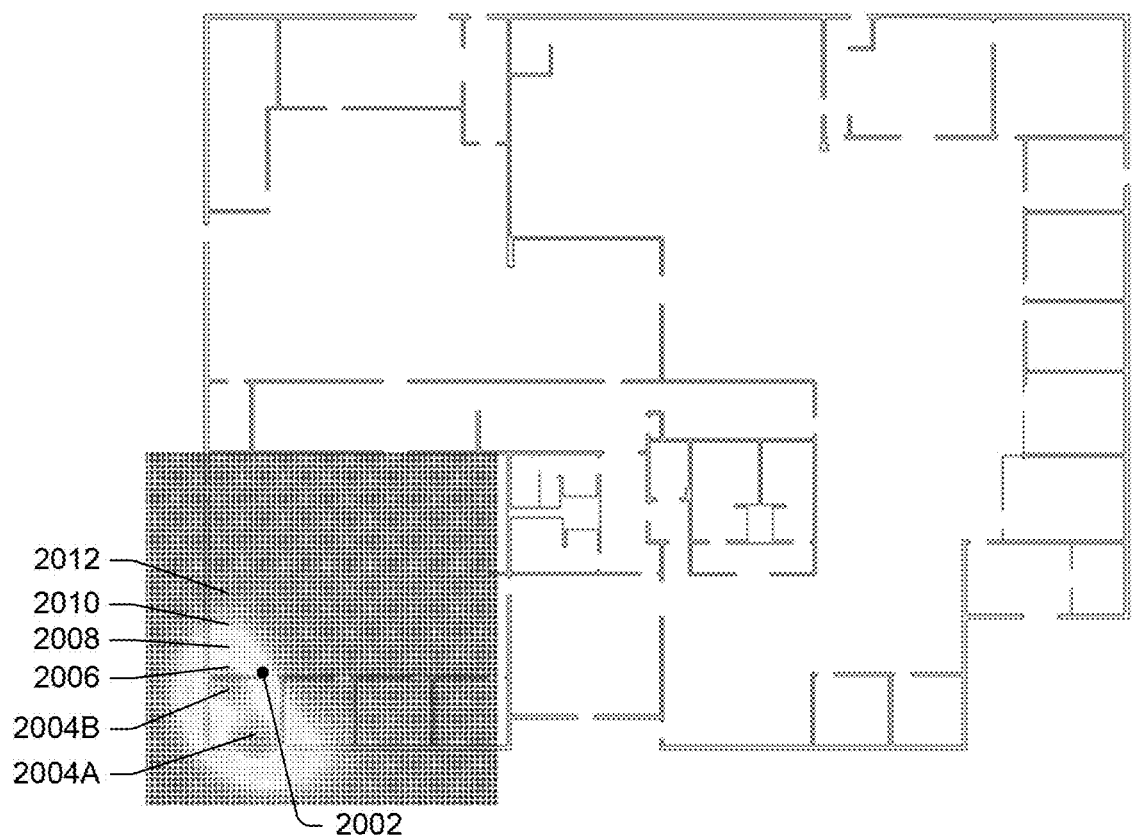
FIG. 20 is a planar schematic diagram of an example RF likelihood map, based on a combination of individual RF maps, in accordance with the present invention

Referring to FIG. 20, there is shown an example RF likelihood map 2000, based on a combination of individual RF maps. The various RF sensors located in proximity to the mobile tag, thus receiving one or more RF signals from the mobile tag, collect data that is combined by the location determining system to generate the likelihood of being at a particular second location. The RF likelihood map 2000 includes multiple central areas 2004A, 2004B and multiple rings 2006-2012 located about the central areas, each representing different likelihoods of a determined location for the mobile tag within a structure. The location determining system generates a set of weighted likelihoods of the mobile tag being located at each second location of these multiple second locations. The central areas 2004A, 2004B represent the areas of the structure having the highest likelihood of representing the location of the mobile tag, based on the RF likelihood map 2000. The first ring 2006 represents the area of the structure having the second highest likelihood of representing the location of the mobile tag. The second ring 2008 represents the area having the third highest likelihood, the third ring 2010 represents the area having the fourth highest likelihood, and the surrounding area 2012 beyond the third ring represents the least likelihood of representing the location of the mobile tag. For this example, the black dot 2002, which is not necessarily included by the RF likelihood map, may represent a true location of the mobile tag.

For some embodiments, the individual RF maps may be combined by multiplying each point together with the same x, y location. Other ways of combining the data maps include, but are not limited to, using addition and a Bayesian method. It shall be noted that, although the response is described above as being substantially symmetric about each sensor, the response may also be customized by the location determining system or building automation system for a possible non-symmetric shape to represent attenuation due to boundaries, portals, and other factors, to provide better performance. Also, the location determining system may observe the RF (e.g., RSSI) loss between RF sensors, compare them to expected values, and adjust the RF used on a grid point-by-grid point basis. For example, if the grid point is located in a different room relative to the RF sensor, the signal strength may be adjusted accordingly. The adjustment may be based using information from the sensor loss from one RF sensor to another RF sensor in the same room and other RF sensors nearby.

Motion Likelihood Map

Figure 21:
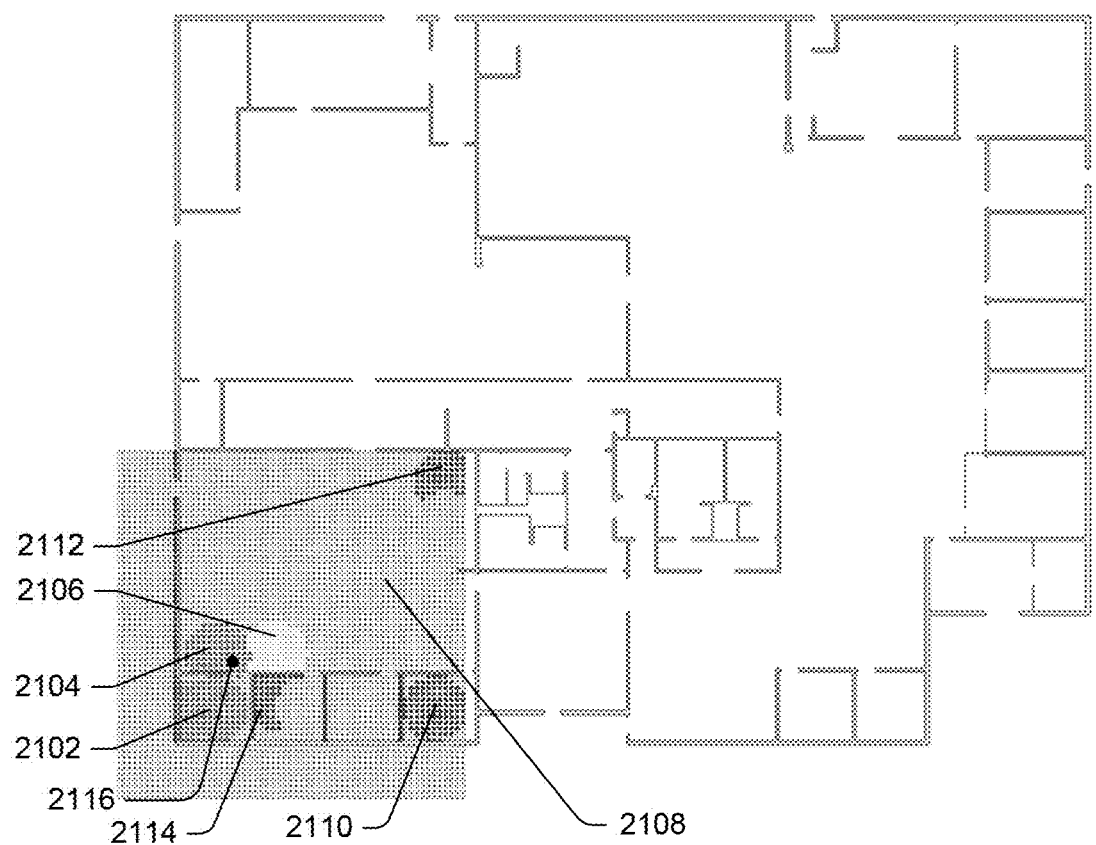
FIG. 21 is a planar schematic diagram of an example motion likelihood map in accordance with the present invention.

Referring to FIG. 21, there is shown an example motion likelihood map 2100. The location determining system, or more particularly a controller of the location determining system, generates a set of weighted likelihoods of the mobile tag, in addition to the first set of weighted likelihoods based on the distance likelihood map, being located at each second location of the multiple second locations based on a structure condition. The motion sensors sense the structure condition based on motion detected in proximity to each sensor of the plurality of sensors.

An example of a motion sensor technology that may be utilized for the location determining system is a Passive Infrared (PIR) sensor. Data collected by each motion sensor may be used to detect the amount of activity below the motion sensor. If a mobile tag, or a person having a mobile tag, is traversing under the motion sensor, then the motion sensor will return a strong signal. As a result, the location determining system may determine a likelihood that the mobile tag, or a person/object including the mobile tag, is under the motion sensor. In addition, the mobile tag may include an accelerometer to help the system determine whether to use the collected information or not.

As shown in FIG. 21, the motion likelihood map 2100 indicates the likelihood of being at various second locations within the structure. The motion likelihood map 2100 includes one or more first motion areas 2102, 2104 of the structure having the highest likelihood of representing the location of the mobile tag, based on the motion likelihood map. The motion likelihood map 2100 may also include one or more second motion areas 2106 having the second highest likelihood and one or more third motion areas 2108 having the third highest likelihood. The motion likelihood map may further include one or more low motion areas 2110, 2112, 2114, where the motion sensor readings are so low that the likelihood of someone or something moving under them is highly unlikely. It should be noted that the areas for future or anticipated detection motion may be determined in advance because the motion sensors are located at fixed positions within the structure. Also, many of the boundaries of the structure, such as walls, effectively block infrared signals so that aspect of the structure may be modeled in the motion likelihood map 2100. Further, a motion sensor may have overlapping coverage with one or more other motion sensors so the minimum, maximum, average, first in the list, last in the list, or other methods may be used to combine the overlapping signals.

Structure Likelihood Map

Figure 22:
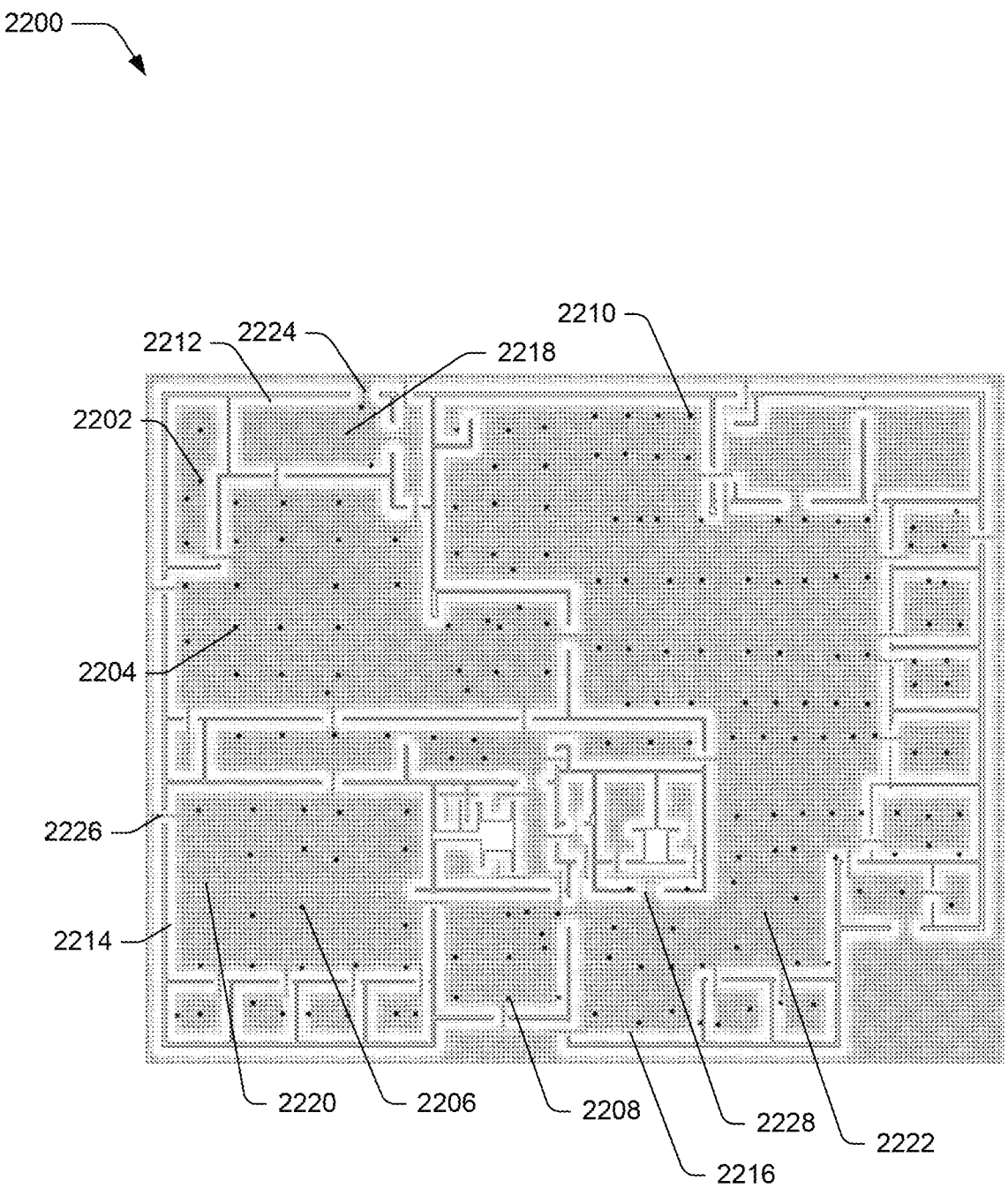
FIG. 22 is a planar schematic diagram of an example structure likelihood map in accordance with the present invention.

Referring to FIG. 22, there is shown an example structure likelihood map 2200 having multiple grid points, such as grid points 2202-2210. The likelihood may be set for each quantized grid point in a structure. Also, the likelihood may be reduced if a mobile tag is located adjacent to, or against, a boundary, such as a wall. For example, the structure likelihood map 2200 reflects this lower likelihood along the boundaries 2212, 2214, 2216 of the rooms and open areas 2218, 2220, 2222 of the structure. The structure likelihood map 2200 may further indicate a higher likelihood for passages and portals 2224, 2226, 2228 located among the rooms, areas, and other boundaries.

The structure likelihood map 2200 may also indicate areas of the structure having a higher likelihood of maintaining an object, as opposed to a person. This is particularly the case when trying to find the location of an inventory object, as they are typically in a room or similar area. Also, the location determining system may seek an item associated with a particular room, but actually outside of the room, then the structure likelihood map may include information to assist the system to locate that item efficiently. These types of likelihoods may be indicated by the structure likelihood map 2200 based upon combinations that include if the object is a person, an inventory item, type of inventory item moving, a guest, an employee, type of employee, etc. The structure likelihood map 220 may further include areas that may be changed such as maintenance closets, tiny closets, locked rooms, bathrooms, kitchens, and the like. Furthermore, the location determining system may generate and maintain the structure likelihood map 2200 by observing the structure covered by the map and setup or update the map based upon the machine learning. For example, some common walk paths may be marked in one layer, in which the structure likelihood map 2200 may identify a high likelihood for expected walking areas and a lower likelihood for non-expected walking areas. Then, when the location determining system tracks the actual walking areas, each grid point may be filter on a grid point-to-grid point filtering over time. The connection of grid points may be smoothed out to add some correlation in space, since many items typically move in a substantially straight line.

Combined Set of Likelihood Maps

Figure 23:
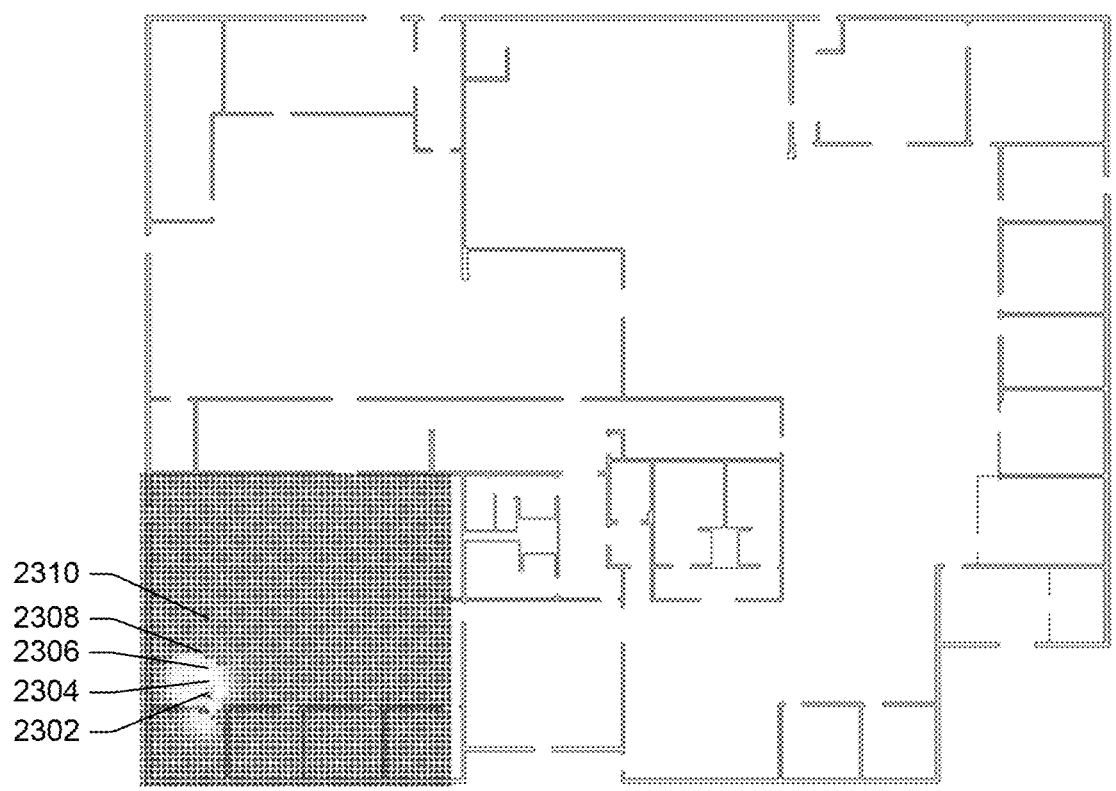
FIG. 23 is a planar schematic diagram of an example final likelihood map, based on a combined set of likelihoods, in accordance with the present invention.

Referring to FIG. 23, there is shown an example final likelihood map 2300 based on a combined set of likelihoods. The location determining system, or more particularly the controller of the location determining system may generate a combined set of likelihoods based on the first set of weighted likelihoods and the second set of weighted likelihoods, and the system and/or controller may determine the location of the mobile tag within the structure based on the combined set of likelihoods. The first set of weighted likelihoods and the second set of weighted likelihoods may include, but are not limited to, a distance likelihood map, a radio frequency ("RF") likelihood map, a motion likelihood map, a structure likelihood map, other distance maps based on acoustic sensors, and the like.

The final likelihood map 2300 includes one or more first final areas 2302 of the structure having the highest likelihood of representing the location of the mobile tag, based on the final likelihood map. The final likelihood map 2200 may also include one or more second final areas 2304 having the second highest likelihood, one or more third final areas 2106 having the third highest likelihood, and one or more fourth final areas 2308 having the fourth highest likelihood. The final likelihood map 2300 may further include one or more surrounding final areas 2310 having less likelihood of representing the location of the mobile tag than the first, second, third or fourth final areas 2302-2308.

To combine likelihood maps, the location determining system may stack multiple likelihood grids. For example, all matching points of the likelihood grids may be multiplied together. Other ways of combining the data exist including using addition and a Bayesian method. For example, likelihood maps may be combined by the location determining system by multiplying each grid point for the distance, radio frequency, motion, and/or structure. The area under the surface is then normalized to one, and the sum of all resulting grid points would be one. The more likelihood maps that are combined by the location determining system, the closer the determined location will be to the true location of the mobile tag. After the location determining system determines the final likelihood map 2300, the map may be fed to an optimal estimator, such as a Kalman filter, for further refinement.

Flow Diagram of Technique

Figure 24:
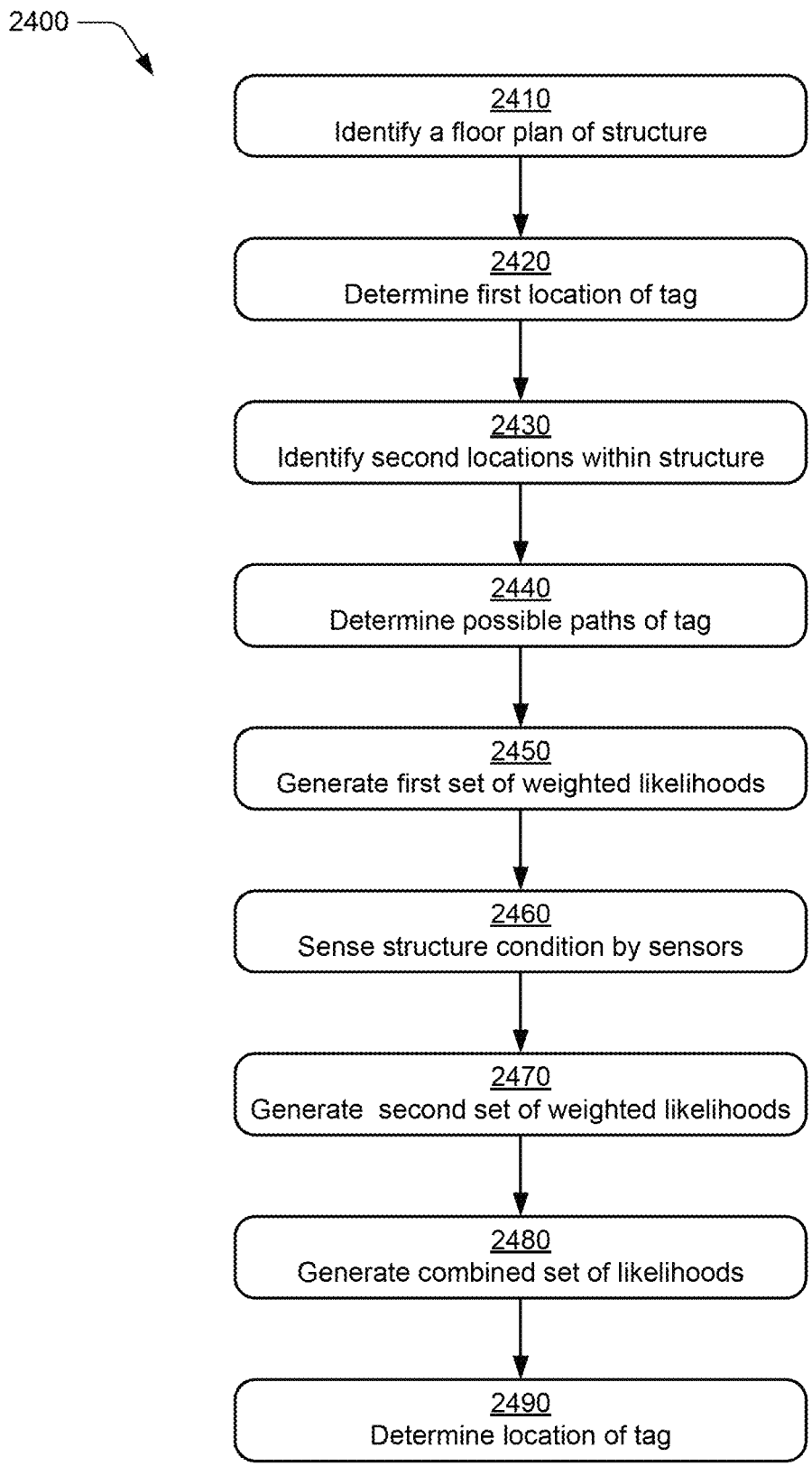
FIG. 24 is a flow diagram representing an example operation of the location determining system in accordance with the present invention.

FIG. 24 illustrates an example operation of the location determining system. The location determining system may identify a floor plan of the structure at step 2410. The location determining system may also, or in the alternative, determine a first location of a mobile tag within a structure at step 2420. The second locations may be distributed throughout at least a portion of the floor plan. The location determining system may then identify multiple second locations within the structure at step 2430. In doing so, the location determining system may associate each second location of the multiple second locations with directional data distinguishing blocked paths from non-blocked paths. To associate each second location with the directional data, the location determining system may associate each second location of the multiple second locations with a boundary having a shape determined by the directional data. It should be noted that the location determining system may determine determining the first location of the mobile tag at a first time, i.e., within a particular time period for the first location.

Next, the location determining system may determine multiple possible paths of the mobile tag within the structure at step 2440. Thereafter, the location determining system may generate a first set of weighted likelihoods of the mobile tag at step 2450. The first set of weighted likelihoods represent the mobile tag being located at each second location of the multiple second locations based on the plurality of possible paths and distances between the first location and the plurality of second locations. For some embodiments, the location determining system may generate the first set of weighted likelihoods of the mobile tag being located at each second location at multiple second times, i.e., within particular time periods for the second locations. For these embodiments, the first set of weighted likelihoods is generated based on differences between the first time and the multiple second times, as well as the possible paths and the distances between the locations.

In addition to generating the first set of weighted likelihoods, the location determining system may generate another set of weighted likelihoods. In particular, the location determining system senses a structure condition by multiple sensors at step 2460. The multiple sensors are positioned at different locations of the structure. The location determining system then generates a second set of weighted likelihoods of the mobile tag at step 2470. The second set of weighted likelihoods represent the mobile tag being located at each second location of the multiple second locations based on the structure condition. For some embodiments, the location determining system may generate the second set of weighted likelihoods of the mobile tag being located at each second location at multiple second times, i.e., within particular time periods for the second locations. For these embodiments, the second set of weighted likelihoods is generated based on the structure condition.

The multiple sensors may sense the structure condition in a variety of ways. For some embodiments, the sensors may sense the structure condition by receiving a wireless signal from the mobile tag, such as a beacon sent by the mobile tag. For example, the wireless signal received from the mobile tag may include a signal strength of the wireless signal. As another example, the wireless signal may be received in response to detecting motion at the mobile tag by a motion sensor, such as an accelerometer or pedometer, of the mobile tag. For some embodiments, the sensors may sense the structure condition by sensing motion in proximity to each sensor of the multiple sensors. For example, each sensor may utilize passive infrared technology to sense movement in proximity to the sensor.

The location determining system may generate a combined set of likelihoods based on the first set of weighted likelihoods and the second set of weighted likelihoods at step 2480. Regardless of whether the combined set of likelihoods is generated, the location determining system may determine a location of the mobile tag within the structure based on the first set of weighted likelihoods and the second set of weighted likelihoods at step 2490. Where the combined set of likelihoods is generated, the location determining system may determine the location of the mobile tag based on the combined set of likelihoods.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A location determining system, comprising:
   a mobile tag positioned at a first location within a structure, the structure including a plurality of second locations;
   a plurality of sensors positioned at different locations of the structure, the plurality of sensors being configured to sense a structure condition; and
   a controller, the controller operating to:
      determine a plurality of possible paths of the mobile tag within the structure;
      generate a first set of weighted likelihoods of the mobile tag being located at each second location of the plurality of second locations at a future point in time based on the plurality of possible paths and distances between the first location and the plurality of second locations;
      determine a distance between the mobile tag and the plurality of sensors based on at least one beacon received from the mobile tag by the plurality of first sensors;
      generate a second set of weighted likelihoods of the mobile tag being located at each second location of the plurality of second locations based on the distance between the mobile tag and the plurality of sensors; and
      determine a location of the mobile tag within the structure based on the first set of weighted likelihoods and the second set of weighted likelihoods.

2. The location determining system as described by claim 1, further comprising a floor plan of the structure, wherein the plurality of second locations are distributed throughout at least a portion of the floor plan.

3. The location determining system as described by claim 1, wherein the controller associates each second location of the plurality of second locations with directional data distinguishing blocked paths from non-blocked paths.

4. The location determining system as described by claim 3, wherein the controller associates each second location of the plurality of second locations with a boundary having a shape determined by the directional data.

5. The location determining system as described by claim 1, wherein the plurality of sensors receive a signal strength from the mobile tag.

6. The location determining system as described by claim 5, wherein:
the mobile tag includes a motion sensor; and
the plurality of sensors receive a wireless signal in response to the motion sensor detecting motion at the mobile tag.

7. The location determining system as described by claim 1, wherein the plurality of sensors sense motion detected in proximity to each sensor of the plurality of sensors.

8. The location determining system of claim 1, wherein:
the controller generates a combined set of likelihoods based on the first set of weighted likelihoods and the second set of weighted likelihoods; and
the controller determines the location of the mobile tag within the structure based on the combined set of likelihoods.

9. A method for a location determining system comprising:
determining a first location of a mobile tag within a structure at a first time;
identifying a plurality of second locations within the structure;
determining a plurality of possible paths of the mobile tag within the structure;
generating a first set of weighted likelihoods of the mobile tag being located at each second location of the plurality of second locations at a future point in time based on the plurality of possible paths and distances between the first location and the plurality of second locations;
determine a distance between the mobile tag and the plurality of sensors based on at least one beacon received from the mobile tag by the plurality of first sensors;
generating a second set of weighted likelihoods of the mobile tag being located at each second location of the plurality of second locations based on the distance between the mobile tag and the plurality of sensors; and
determining a location of the mobile tag within the structure based on the first set of weighted likelihoods and the second set of weighted likelihoods.

10. The method as described by claim 9, further comprising identifying a floor plan of the structure, wherein the plurality of second locations are distributed throughout at least a portion of the floor plan.

11. The method as described by claim 9, wherein identifying a plurality of second locations within the structure includes associating each second location of the plurality of second locations with directional data distinguishing blocked paths from non-blocked paths.

12. The method as described by claim 11, wherein associating each second location of the plurality of second location with the directional data includes associating each second location of the plurality of second locations with a boundary having a shape determined by the directional data.

13. The method as described by claim 9, further comprising receiving a signal strength from the mobile tag.

14. The method as described by claim 9, further comprising receiving a wireless signal in response to detecting motion at the mobile tag by a motion sensor of the mobile tag.

15. The method as described by claim 9, further comprising sensing motion in proximity to each sensor of the plurality of sensors.

16. The method of claim 9, further comprising generating a combined set of likelihoods based on the first set of weighted likelihoods and the second set of weighted likelihoods, wherein determining the location of the mobile tag within the structure includes determining the location of the mobile tag based on the combined set of likelihoods.

* * * * *